US010462528B2

(12) United States Patent
Yelton et al.

(10) Patent No.: US 10,462,528 B2
(45) Date of Patent: Oct. 29, 2019

(54) METHODS AND SYSTEMS FOR INDICATING POPULAR CONTENT

(71) Applicant: Rovi Guides, Inc., San Jose, CA (US)

(72) Inventors: Alexis Yelton, Somerville, MA (US); Abhijeet Sharma, Boston, MA (US); Peter Boonstra, Arlington, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/817,655

(22) Filed: Nov. 20, 2017

(65) Prior Publication Data

US 2019/0158925 A1 May 23, 2019

(51) Int. Cl.
| | |
|---|---|
| *H04N 21/482* | (2011.01) |
| *H04N 21/45* | (2011.01) |
| *H04N 21/431* | (2011.01) |
| *H04N 21/4722* | (2011.01) |
| *G06F 16/48* | (2019.01) |
| *H04H 60/46* | (2008.01) |
| *H04H 60/65* | (2008.01) |
| *H04H 60/72* | (2008.01) |

(Continued)

(52) U.S. Cl.
CPC ....... *H04N 21/4826* (2013.01); *G06F 3/0482* (2013.01); *G06F 3/0483* (2013.01); *G06F 16/48* (2019.01); *H04H 60/46* (2013.01); *H04H 60/65* (2013.01); *H04H 60/72* (2013.01); *H04N 21/4532* (2013.01); *H04N 21/4722* (2013.01); *H04N 21/4821* (2013.01); *H04N 21/4316* (2013.01)

(58) Field of Classification Search
None
See application file for complete search history.

(56) References Cited

U.S. PATENT DOCUMENTS

| | | | | |
|---|---|---|---|---|
| 5,353,121 A | * | 10/1994 | Young | G04G 15/006 348/E5.007 |
| 6,239,794 B1 | | 5/2001 | Yuen et al. | |

(Continued)

FOREIGN PATENT DOCUMENTS

| | | |
|---|---|---|
| EP | 1783587 | 5/2007 |
| EP | 2159714 | 3/2010 |
| EP | 2284697 | 2/2011 |

OTHER PUBLICATIONS

PCT International Search Report and Written Opinion dated Feb. 4, 2019 for Application No. PCT/US2018/061501 (13 pages).

*Primary Examiner* — Hsiungfei Peng
(74) *Attorney, Agent, or Firm* — Haley Guiliano LLP

(57) ABSTRACT

A media guidance application may indicate popular content by applying a visual attribute to a display of content listings. A media guidance application may generate for display media asset listings in a list. The media guidance application may determine a popular first media asset listing of the media asset listings. The media guidance application may identify a second media asset listing of the media asset listings based on a cursor position. The media guidance application may determine a proximity metric based on a position of the first media asset listing in the list relative to a position of the cursor. The media guidance application may select a visual attribute for the cursor based at least in part on the proximity metric and how popular the popular first listing is. A visual attribute may include, for example, a color.

16 Claims, 16 Drawing Sheets

(51) Int. Cl.
   *G06F 3/0482* (2013.01)
   *G06F 3/0483* (2013.01)

(56) References Cited

U.S. PATENT DOCUMENTS

| | | | |
|---|---|---|---|
| 6,564,378 B1 | 5/2003 | Satterfield et al. | |
| 6,721,953 B1* | 4/2004 | Bates | H04N 5/44543 |
| | | | 348/E5.102 |
| 7,165,098 B1 | 1/2007 | Boyer et al. | |
| 7,761,892 B2* | 7/2010 | Ellis | H04N 5/44543 |
| | | | 725/44 |
| 8,046,801 B2 | 10/2011 | Ellis et al. | |
| 2002/0174430 A1 | 11/2002 | Ellis et al. | |
| 2005/0251827 A1 | 11/2005 | Ellis et al. | |
| 2009/0158162 A1 | 6/2009 | Imai | |
| 2010/0153885 A1 | 6/2010 | Yates | |
| 2012/0060094 A1 | 3/2012 | Irwin | |
| 2014/0089980 A1* | 3/2014 | Alexander | H04N 5/44543 |
| | | | 725/42 |

\* cited by examiner

METHODS AND SYSTEMS FOR INDICATING POPULAR CONTENT

BACKGROUND

People generally want to watch popular media content in an easy to tune, convenient way. Typically, users navigate lists or groupings of popular content, but navigation by popularity may cause the user to miss content they may like that is not the most popular. Also, a user may not know how to navigate to more popular content.

Sometimes a user might be interested in knowing which show is most popular in his or her region right now. A user might also be interested in which show is most popular this week or month. Perhaps a user would like to also know which shows are most popular across genres like sports, movies, sitcoms, or dramas. As the amount of content increases, navigating among the content listings to find popular content may prove challenging.

Typical systems sometimes identify popular listings but a user has to navigate to a particular listing to know that it is popular. Sometimes, popular listings are not included in the display screen, and the user has no idea of how to navigate to those popular listings, nor how close or far they are from those listings. Accordingly, the user can miss out on content they might otherwise be interested in viewing. Additionally, systems expend resources determining popularity but if a user does not navigate to popular content, these resources aren't particularly well-spent.

SUMMARY

Therefore, systems and methods are described herein for a more convenient way to indicate popular content in a listing of media assets. As a user navigates listings, a visual attribute is used to indicate that the user is navigating near or far from popular content. In some embodiments, a system is provided that merges normal content browsing with an easy to determine indicator of where the more popular content is located. A popularity heat map, for example, is provided while navigating the guide that informs the user how close ("warm") or far ("cold") his current cursor position is to a popular content listing. As the user navigates closer to popular content, or content that exceeds a threshold popularity, a visual attribute such as the color of the cursor or background, will change. As such, even if the popular listing is not actually displayed in the list of programs, the user is informed about its existence and how close or far the user has to navigate to reach the popular listing.

In some aspects, a media guidance application executed by control circuitry of a user equipment and/or server may be configured for indicating popular content to a user. In order to avoid complicating the description, these systems and methods will be described in terms of a media guidance application. However, it should be noted that systems and methods described here may be utilized outside of a media guidance application.

In some embodiments, a media guidance application may indicate popular content by generating for display a plurality of media asset listings in a list. For example, the media guidance application may generate for display a listing of shows, arranged by channel, time, name, or other suitable parameter or group of parameters. The media guidance application may determine a popularity metric for a media asset associated with a first media asset listing of the plurality of media asset listings. For example, the media guidance may determine a most popular show among many shows in the list. The media guidance application may identify with a cursor a second media asset listing of the plurality of media asset listings. For example, the media guidance application may receive a user selection of a particular show in the listing using a cursor. The media guidance application may determine a proximity metric based on a first position of the first media asset listing in the list relative to a second position of the cursor. For example, the media guidance application may determine where the most popular show is in the list, and where the user selected show is in the list, and determine how close the user selected show is to the most popular show. The media guidance application may select a visual attribute for the cursor based at least in part on the proximity metric and the popularity metric. For example, the media guidance application may change the appearance of the user selected show to indicate how close it is to the most popular show.

In some embodiments, a media guidance application may indicate popular content by generating for display a plurality of media asset listings in a list. For example, the media guidance application may generate for display a listing of shows, arranged by channel, time, name, or other parameter. The media guidance application may determine a popularity metric for a media asset associated with a first media asset listing. For example, the media guidance application may retrieve popularity information from a database to determine the popularity metric (e.g., a number of views for each media asset). The media guidance application may determine a first position metric associated with the first media asset listing. For example, the media guidance application may determine where a trending (e.g., popular) show listing is located among the listings. The media guidance application may identify with a cursor a second media asset listing of the plurality of media asset listings. For example, the media guidance application may determine a second show based on a cursor position (e.g., a selected or highlighted show). The media guidance application may determine a second position metric associated with the second media asset listing. For example, the media guidance application may determine where the second show listing is located among the listings. The media guidance application may determine a proximity metric based on the first position metric and the second position metric. For example, the media guidance application may determine how close the second show listing is to the trending show listing. The media guidance application may select a visual attribute for the second media asset listing based at least in part on the proximity metric and the popularity metric. For example, the visual attribute of the second media asset listing may include a color of the second media asset listing. In an illustrative example, the media guidance application may change the color of the highlighted second show listing based on how close it is to the trending listing, and how popular the trending listing is. Accordingly, the media guidance application may indicate how close a listing is to a popular listing (e.g., the trending listing). Further, as the cursor is moved during navigation of the listings, the media guidance application provides an indication of how close the current cursor position is to popular content.

In some circumstances, where the first media asset listing is not included in the plurality of media asset listings, the media guidance application may identify with the cursor a third media asset listing of the plurality of media asset listings. For example, the media guidance application may display only a portion of available listings, and a popular listing may be effectively "off-screen," or in other words not included in a current display. Further, the media guidance application may recognize a cursor position (e.g., the cursor moved to a new position) of a new listing. The media guidance application may determine a third position metric associated with the third media asset listing. For example, the media guidance application may determine a position of the new listing. The proximity metric may be considered a first proximity metric, and the media guidance application may determine a second proximity metric based on the first position metric and the third position metric. For example, the media guidance application may determine how close the new listing is from a popular listing that is not currently displayed (but could be navigated to). The media guidance application may consider the visual attribute to be a first visual attribute, and may select a second visual attribute for the third media asset listing based at least in part on the second proximity metric and the popularity metric. For example, the media guidance application may highlight the new listing to indicate whether it is closer or further from the popular listing than the listing associated with a previous cursor position. Accordingly, the media guidance application may indicate, as a cursor moves, whether the new position is closer to or further from popular content.

In some embodiments, the first visual attribute may include a first color, and the second visual attribute may include a second color. An intensity of the first and second colors may represent how close or far the respective cursor and third media asset listing are to the first media asset listing. For example, as the cursor is positioned nearer to popular content, the color of the listing corresponding to the cursor position may become warmer.

A proximity metric may include a measure of how close a first listing is to a second listing, in terms of displayed distance, or the distance required to navigate from the one listing to the other. A proximity metric, as determined by a media guidance application may include at least one of a number associated with media asset listings of the plurality of media asset listings positioned in between the first media asset listing and the second media asset listing, a number of pixels associated with a region in between the first position and the second position, a number associated with a difference between the first position and the second position, a number associated with a spatial distance between the first position and the second position on a display, any other proximity metric, or any combination thereof.

In some embodiments, a media guidance application may determine a visual attribute for a media asset listing by searching a database based at least in part on a proximity metric, and retrieving from the database, based on the searching, the visual attribute for the media asset listing. For example, the media guidance application may input to the database a measure of the distance between a listing and a popular listing, and retrieve from the database a color or other visual attribute to apply to the listing. In an illustrative example, a smaller proximity metric value (e.g., smaller distance) may correspond to a warmer color (e.g., higher red component).

In some embodiments, a media guidance application may determine a visual attribute for a media asset listing by inputting the proximity metric into a function, and determining, based on the function, the visual attribute for the media asset listing. For example, the media guidance application may input to the function a number indicative of the distance between a listing and a popular listing, and retrieve as output from the function a number indicative of a color or other visual attribute to apply to the listing. In an illustrative example, a smaller proximity metric value (e.g., smaller distance) may correspond to a warmer color (e.g., higher red component).

In some embodiments, a media guidance application may determine a popularity metric for a media asset by determining a plurality of popularity metrics associated with the plurality of media assets associated with the plurality of media asset listings, and ranking the plurality of popularity metrics. For example, the media guidance application may determine a popularity score for every available listing, and then select a popular score by filtering among the scores (e.g., highest score, highest score this week).

In some embodiments, a media guidance application may identify a media asset listing based at least in part on a popularity metric. For example, a media guidance application may determine one or more most popular listings, and use at least one of the most popular listings as a reference for determining a proximity metric. For example, the media guidance application may determine a popularity score for every available listing, and then select one or more popular listings by filtering among the scores (e.g., highest score).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

A media guidance application may generate, determine, or access popularity information to determine popular content listings among many content listings. When presented for display, the content listings may require significant navigation by a user to locate the popular content listings. Accordingly, a media guidance application may determine how far one or more popular content listings are from a location among displayed listings, and indicate to a user how to navigate to the popular content. The media guidance application may use a highlight color, for example, to indicate to the user if they are getting closer to, or further from, popular content. Further, the entirety of a collection of listings is not always displayed at any given instant. Accordingly, because some listings may not be viewable without some navigation, a media guidance application may help a user to find popular listings that are not displayed on a particular screen, but could be if navigated to.

Figure 1A:
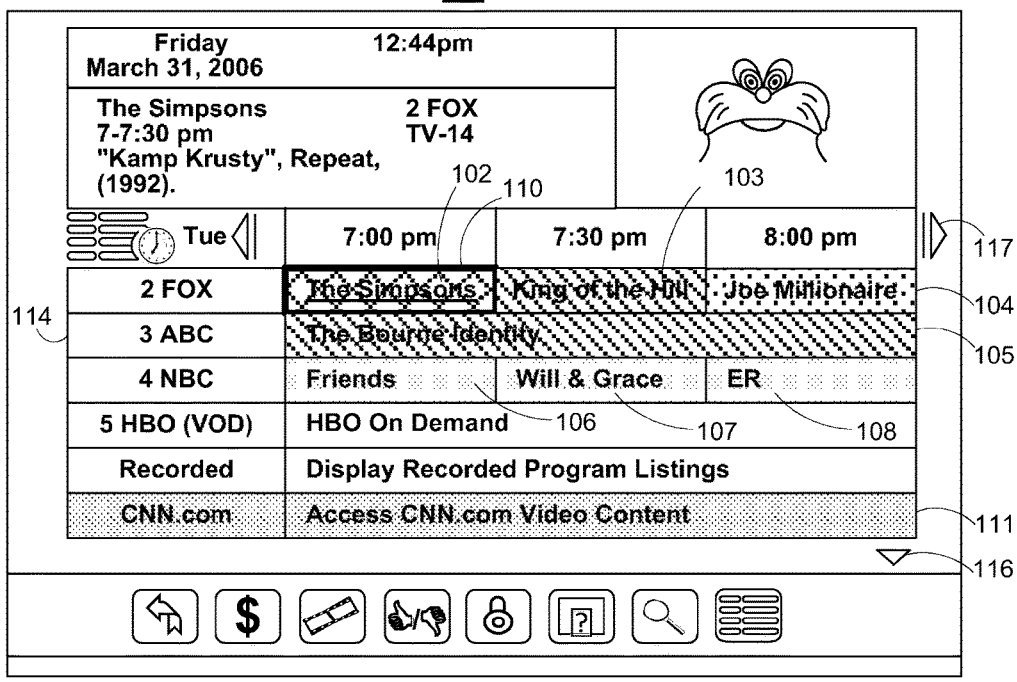
FIG. 1A shows an illustrative embodiment of a display screen including a visual attribute indicating popular content, in accordance with some embodiments of the disclosure.

FIG. 1A shows an illustrative embodiment of display screen 100 including a visual attribute indicating popular content, in accordance with some embodiments of the disclosure. A group of listings 114 are displayed on display screen 100. In some embodiments, displayed listings 114 may represent a plurality of media asset listings in accordance with flowcharts 700, 800, 900, 1200, and 1300. In some embodiments, only a portion of displayed listings 114 may be part of a plurality of listings in accordance with flowcharts 700, 800, 900, 1200, and 1300. For example, a media guidance application may in some circumstances only consider listings of listings 114 that correspond to 7:00 pm (e.g., correspond to the same time as the listing correspond to highlight region 110). In a further example, a media guidance application may in some circumstances only consider listings of listings 114 that correspond to channel 2 Fox (e.g., correspond to the same row as the listing correspond to highlight region 110).

In some embodiments, displayed listings 114 may be a portion of a plurality of listings, wherein some listings of the plurality of listings are not displayed. Accordingly, in some embodiments, a media guidance application may receive input from a user navigating to not-currently-displayed listings by using navigational icons 116 and 117. In some circumstances, one or more popular listings may be part of displayed listings 114. In some circumstances, one or more popular listings may be part of a plurality of listings but not currently displayed as part of displayed listings 114.

In the illustrative example of FIG. 1A, listing 102 is the most popular listing. Accordingly, in this example, the intensity for visual attribute for listing 102 is maximized. In illustrative display screen 100, maximized intensity is the most densely hatched listing (i.e., listing 102). A media guidance application may maximize the intensity of a visual attribute by changing a color (e.g., applying a warmest color), changing a transparency (e.g., making a color more opaque), or apply other visual indicators that let a user know which listings are popular, or near popular content. Listing 103 is near to listing 102 in display screen 100, while listing 104 is further away from listing 102 than listing 104, for the channel Fox at various times. Listing 105 is near to listing 102 in display screen 100, while listings 106, 107, and 108 are further away from listing 102 than listing 105, for various channels (e.g., ABC, NBC) and times (e.g., 7:00 pm, 7:30 pm, 8:00 pm). Accordingly, in this illustrative example, a visual attribute of listing 102 has a most intense visual attribute (i.e., most hatching or shading as shown) because it is the most popular, making it readily noticeable to a user. Listings 103 and 105 have relatively less intense visual attributes (e.g., less hatching in this example) than listing 102, as they are not the most popular listing but are near to the popular listing 102 (e.g., within one listing away). Listings 104, 106, 107, 108 have relatively lesser intense visual attributes than listings 102, 103 and 105. In the illustrative display screen 100, a visual attribute is a density of hatching (or shading) in the listing fill for simplicity. As described herein, any suitable visual attribute may be used in accordance with the present disclosure.

Highlight region 110 has a position in display screen 100 corresponding to listing 102. In illustrative display screen 100, each media asset listing may have a visual attribute, and the visual attribute for a listing may be displayed whether or not highlight region 110 corresponds to the listing. For example, display screen 100 may show which programs are near the most popular listing 102 regardless of the position highlight region 110.

Listing 111 of display screen 100 of FIG. 1A exhibits a visual attribute (e.g., shown by stippling in FIG. 1A). In some embodiments, more than one popular listing may be used to determine a proximity metric. For example, a listing that is not listing 102 may be popular (e.g., most popular in another category, or second most popular overall), and positioned just off-screen to the bottom of display screen 100 (e.g., not visible in display screen 100). Accordingly, in some embodiments, a media guidance application may apply a visual attribute to listing 111 based on a different popular content listing than that used to apply the visual attribute other listings. For example, proximity to listing 102 may factor into the visual attribute applied to listing 105, while proximity to a different popular listing may factor in the visual attribute applied to listing 111. In such a way, more than one popular listing may be indicated as a media guidance application receives input from a user navigating a display screen.

Figure 1B:
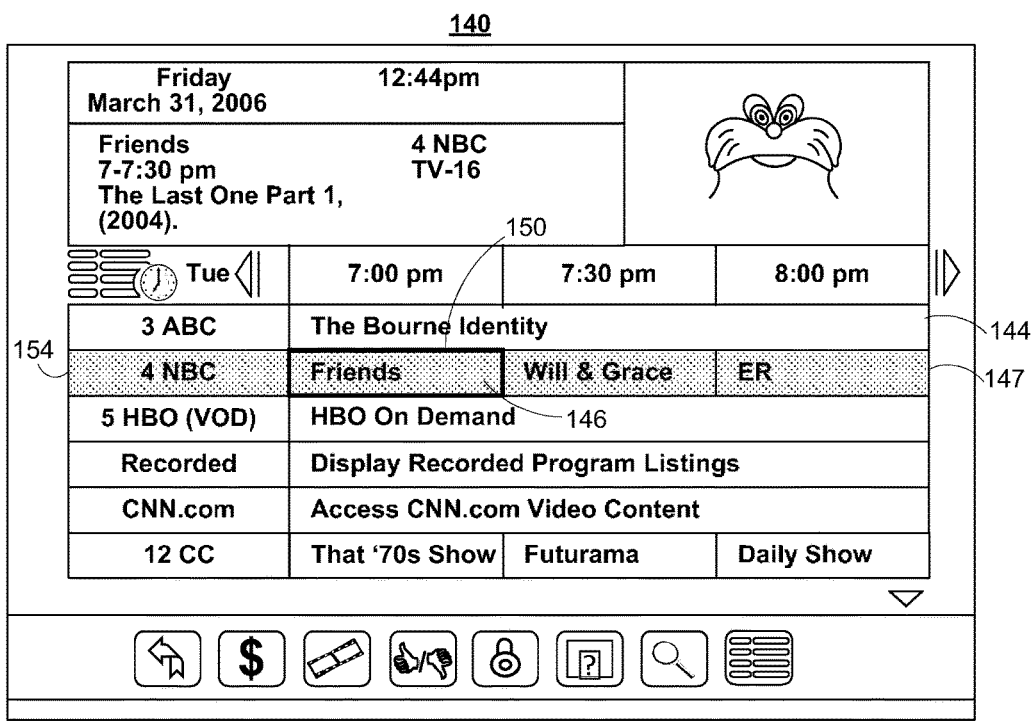
FIG. 1B shows an illustrative embodiment of a display screen including a visual attribute indicating popular content, in accordance with some embodiments of the disclosure.
Figure 1C:
FIG. 1C shows an illustrative embodiment of a display screen including a visual attribute indicating popular content, in accordance with some embodiments of the disclosure.

FIG. 1B shows an illustrative embodiment of a display screen 140 including a visual attribute indicating popular content, in accordance with some embodiments of the disclosure. Displayed listings 154 do not include a most popular media asset listing (e.g., a media guidance application receives input from a user navigating to screen 154 and the most popular listing is no longer visible). Referencing display screen 140, media asset listing 146, which refers to the listing of the row 147 associated with channel NBC and a time of 7:00 pm (e.g., based on highlight region 150 position), has a visual attribute. Other listings that do not correspond to highlight region 150 do not have an applied visual attribute. In this example, the entire row 147 of listings associated with the listing corresponding to highlight region 150 have a visual attribute applied. Accordingly, a media guidance application may use the configuration of display screen 140 to indicated which channel has the most popular content at the time corresponding to highlight region 150. For example, highlight region 150 is positioned at 7:00 pm, and accordingly a media guidance application may determine channel NBC as having the most popular content at 7:00 pm. In a further example, referencing FIG. 1B, more popular content listings may be located just above row 144 and not displayed in display screen 140. If a media guidance application receives input from a user navigating highlight region 150 to row 144, the media guidance application may present display screen 160, having displayed listings 174, as shown in FIG. 1C. Highlight region 170 highlights listing 144, which now has a visual attribute applied, as compared to listing 144 (e.g., highlight region not corresponding to listing 144). In display screen 160, listing 144 has a more intense visual attribute applied than listing 146 of display screen 140, because it is nearer to popular content (e.g., the most content is just off screen above listing 144).

Figure 1D:
FIG. 1D shows an illustrative embodiment of a display screen including a visual attribute indicating popular content, in accordance with some embodiments of the disclosure.

FIG. 1D shows an illustrative embodiment of a display screen 180 including a visual attribute indicating popular content, in accordance with some embodiments of the disclosure. Displayed listings 194 include a most popular media asset listing 182. Highlight region 190 is positioned at listing 196. A visual attribute 197 is applied to listing 196, in the form of a star icon with fill pattern. For example, referencing FIG. 1D, if a media guidance application receives input from a user navigating highlight region 190 to listing 194, the media guidance application may apply a more intense visual attribute to listing 194, such as a larger, or more intensely colored star icon to indicate proximity to listing 182.

Figure 2A:
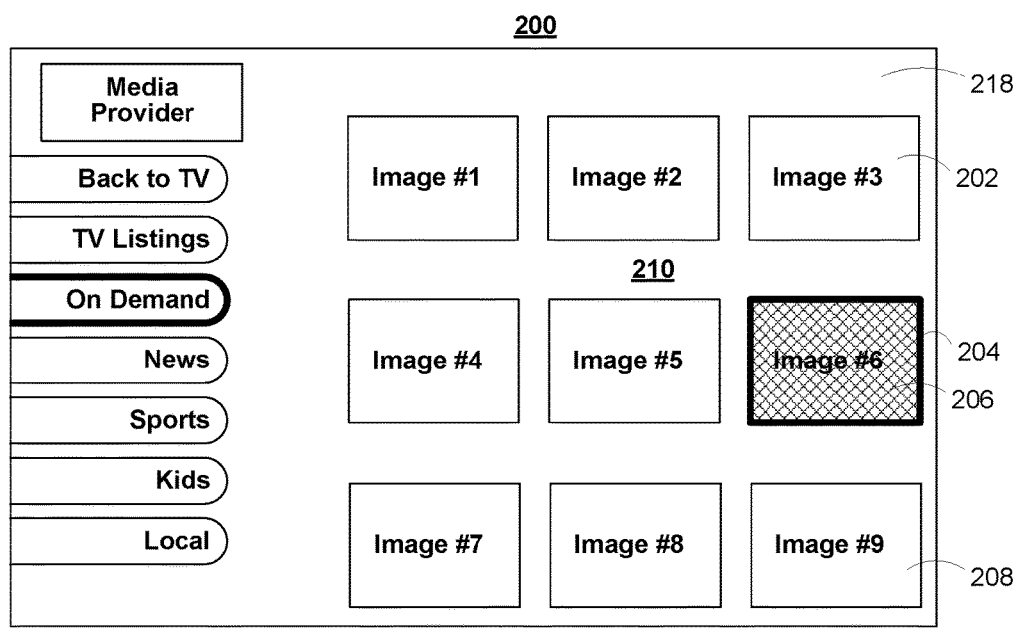
FIG. 2A shows an illustrative embodiment of a display screen that may be used to provide media guidance application listings having a visual attribute to indicate popular content, in accordance with some embodiments of the disclosure.

FIG. 2A shows an illustrative embodiment of a display screen 200 that may be used to provide media guidance application listings having a visual attribute to indicate popular content, in accordance with some embodiments of the disclosure. Listing 202 is a most popular listing of displayed listings 210 in display screen 200, and highlight region 204 is positioned at listing 206. A visual attribute is applied to listing 206, based on its proximity to listing 202, and the popularity of listing 202, in display screen 200. For example, if a media guidance application receives input from a user navigating highlight region 204 to listing 208, the media guidance application may apply a visual attribute to listing 208, with a decreased intensity as compared to that shown for listing 206 in FIG. 2A. In a further example, if a media guidance application receives input from a user navigating highlight region 204 to listing 202, the media guidance application may apply a visual attribute to listing 208, with an increased intensity, or even maximized intensity, as compared to that shown for listing 206 in FIG. 2A. In accordance with the present disclosure, the media guidance may remove, add, maintain, lessen the intensity of, increase the intensity of, or otherwise suitably manage, the visual attribute of listing 206 in response to highlight region 204 moving. Background 218 has no visual attribute applied based on a proximity metric or popularity metric in illustrative display screen 200.

Figure 2B:
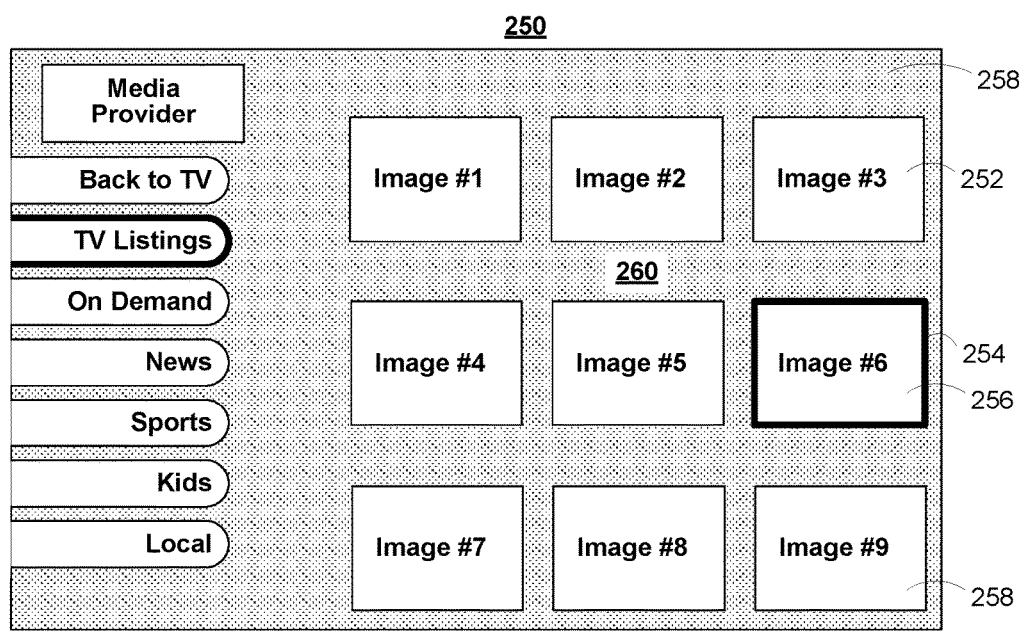
FIG. 2B shows an illustrative embodiment of a display screen that may be used to provide media guidance application listings having a visual attribute to indicate popular content, in accordance with some embodiments of the disclosure.

FIG. 2B shows an illustrative embodiment of a display screen 250 that may be used to provide media guidance application listings having a visual attribute to indicate popular content, in accordance with some embodiments of the disclosure. Listing 252 is a most popular listing of displayed listings 260 in display screen 250, and highlight region 254 is positioned at listing 256. A visual attribute is applied to background 258, based on the proximity of listing 256 to listing 252, and the popularity of listing 252, in display screen 250. For example, if a media guidance application receives input from a user navigating highlight region 254 to listing 258, the media guidance application may apply a visual attribute to background 258, with a decreased intensity as compared to that shown for background 258 in FIG. 2B. In a further example, if a media guidance application receives input from a user navigating highlight region 254 to listing 252, the media guidance application may apply a visual attribute to background 258, with an increased intensity, or even maximized intensity, as compared to that shown for background 258 in FIG. 2B. In accordance with the present disclosure, the media guidance may remove, add, maintain, lessen the intensity of, increase the intensity of, or otherwise suitably manage, the visual attribute of background 258 in response to highlight region 254 moving.

In some embodiments, referencing FIGS. 2A-2B, a media guidance application may apply a visual attribute to one listing, more than one listing, the background or portion thereof, highlight region, any other suitable portion of a display screen, or any combination thereof. For example, the techniques applied to display screens 200 and 250 may be combined, so that a visual attribute is applied to a listing, and a second visual attribute is applied to the background, where the visual attribute and the second visual attribute may be the same or different (e.g., they could be the same color or be different colors).

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
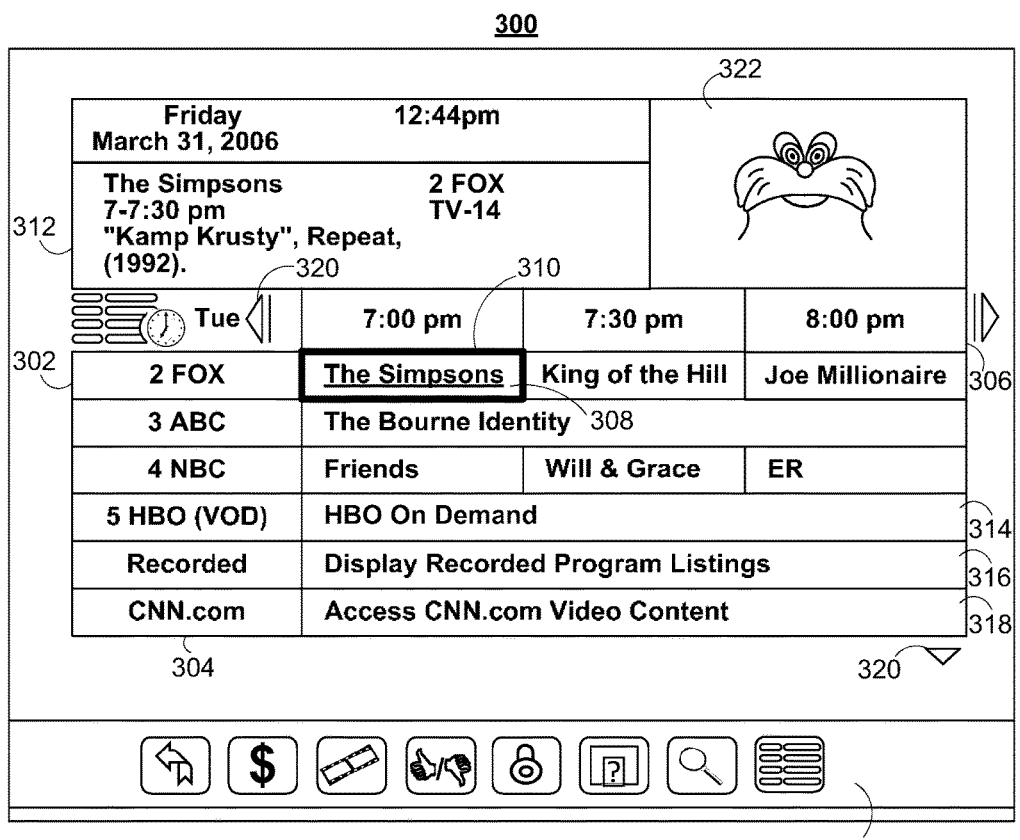
FIG. 3 shows an illustrative embodiment of a display screen that may be used to provide media guidance application listings and other media guidance information, in accordance with some embodiments of the disclosure.
Figure 4:
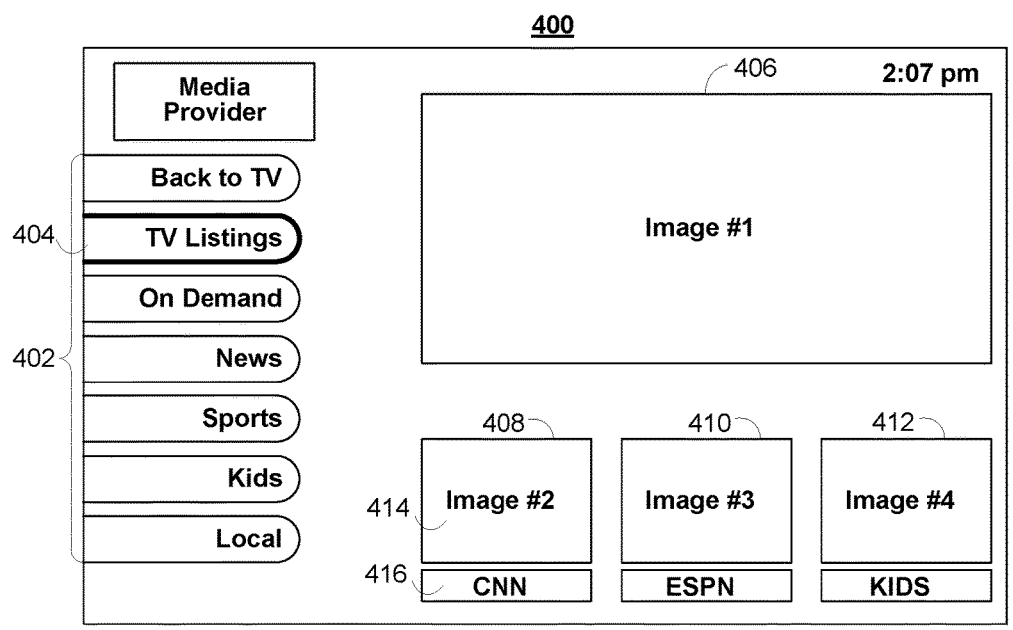
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 324. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 324 may allow the user to access different types of content, media guidance application displays, and/or media guidance application features. Options region 324 may be part of display 300 (and other display screens described herein), or may be invoked by a user by selecting an on-screen option or pressing a dedicated or assignable button on a user input device. The selectable options within options region 324 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
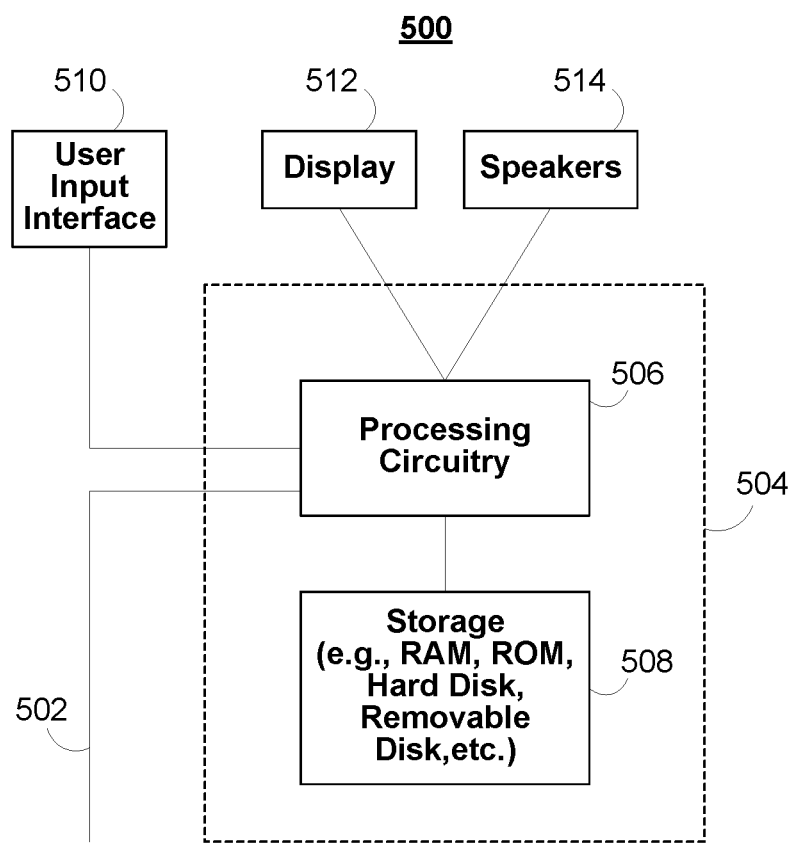
FIG. 5 is a block diagram of an illustrative device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
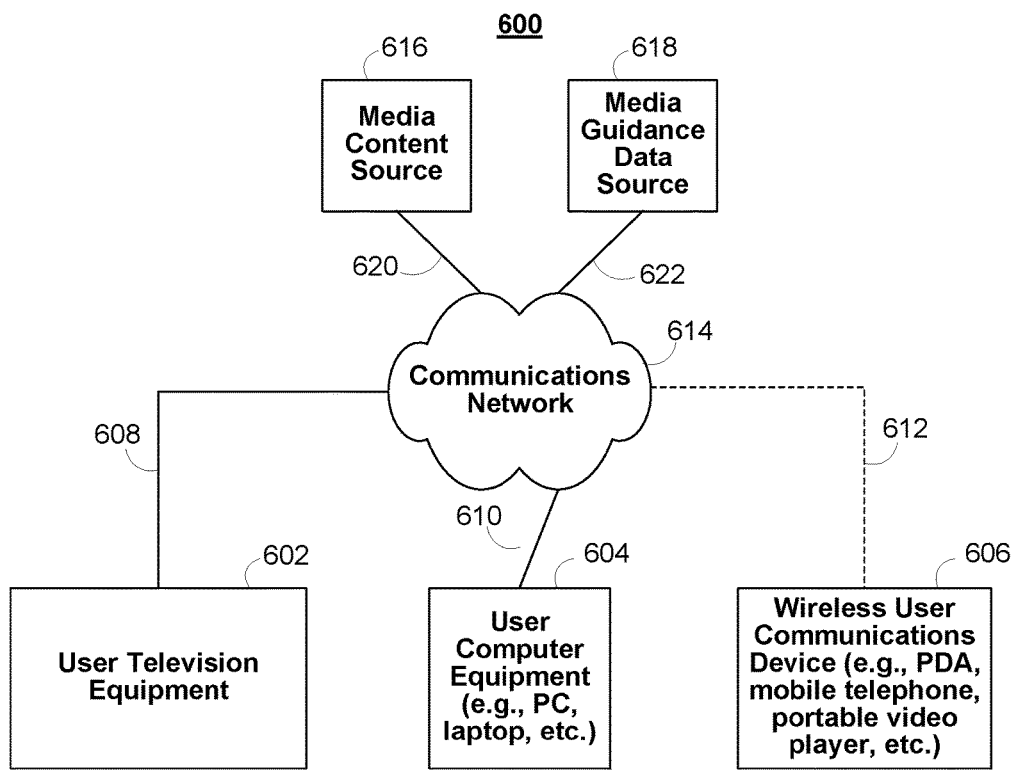
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

System 600 may also include an advertisement source 624 coupled to communications network 614 via a communications path 626. Path 626 may include any of the communication paths described above in connection with paths 608, 610, and 612. Advertisement source 624 may include advertisement logic to determine which advertisements to transmit to specific users and under which circumstances. For example, a cable operator may have the right to insert advertisements during specific time slots on specific channels. Thus, advertisement source 624 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 624 may be configured to maintain user information including advertisement-suitability scores associated with user in order to provide targeted advertising. Additionally or alternatively, a server associated with advertisement source 624 may be configured to store raw information that may be used to derive advertisement-suitability scores. In some embodiments, advertisement source 624 may transmit a request to another device for the raw information and calculate the advertisement-suitability scores. Advertisement source 624 may update advertisement-suitability scores for specific users (e.g., first subset, second subset, or third subset of users) and transmit an advertisement of the target product to appropriate users.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Among media asset listings, that may be presented by a media guidance application, there may be relatively popular listings. For example, a particular program may have been viewed many times, by many users, as compared to other programs. In a further example, a particular media asset may be searched for by users more often than other media assets.

In some embodiments, a media guidance application may, using control circuitry 604, generate a screen, on display 512, with categories of media asset popularity. Categories may include, for example, most popular right now, most popular this week, most popular this month, or most popular across genre. A media guidance application may determine popularity using any suitable metric, of which some illustrative examples are discussed below.

In some embodiments, a media guidance application may determine a popularity metric using control circuitry 604, media guidance data source 618, any other suitable processing equipment local or remote, or any combination thereof. For example, a media guidance application may send data to and receive data from a database via communications network 614.

In an illustrative example, a media guidance application may generate, and collect, an indicator (e.g., ping, heartbeat) including information about a show being watched by a user. The indicator may occur at a regular frequency, an irregular frequency, beginning of viewing, end of viewing, changing of channel, any other time, or any combination thereof. In some embodiments, a media guidance application may receive popularity information based on other users' watching behavior. For example, a media guidance application may receive popularity information from media guidance data source 618. The popularity information may include, for example, a popularity ranking for a plurality of media assets, a popularity score for one or more media assets, a popularity category that one or more media assets may belong to, a most popular media asset, a number of views or a media asset, any other suitable popularity information, or any combination thereof. In some embodiments, a media guidance application may determine a popularity metric based on the popularity information. For example, a popularity metric may be determined by ranking a number of views of a plurality of media assets, and identifying the most viewed media asset. In some embodiments, a popularity metric may be determined by parsing the popularity information, and using a portion of the popularity information directly, without substantive computation. For example, popularity information may include a most viewed media asset, and a popularity metric may be determined directly as the most viewed media asset.

In an illustrative example, a media guidance application may send an indicator (e.g., ping, heartbeat) to a data server with a unique identifier for the media guidance application, and information about a show being watched by a user. For example, a media guidance application may send indicators to media guidance data source 618. The indicator may occur at a regular frequency, an irregular frequency, beginning of viewing, end of viewing, changing of channel, any other time, or any combination thereof. For example, the media guidance application may send an indication to a server at fifteen minute intervals, indicating what a user is currently watching. Any suitable time interval, or trigger may be used to determine when an indication may be sent.

In some embodiments, media guidance data source 618 may collect the indicators from the media guidance application, and add it to a hashmap (e.g., a stored tabulation of indicators). Media guidance data source 618 may, for example, determine the shows with most pings. In some embodiments, a media guidance application may ignore (e.g., stop counting, stop receiving, store separate from previous pings) pings arriving during, or shortly after, determining shows with the most pings. In some embodiments, pings may always be added in the hashmap. In some embodiments, a unique identifier from a media guidance application may help ensure there are no duplicate pings. In some embodiments, it may be determined whether people have watched the show for at least a number of minutes and are not just flipping through channels before an indicator is sent. After media guidance data source 618 calculates, for example, the most popular show, the hashmap is refreshed and the process may start again. The 'most popular show right now' data could, for example, be used to calculate the most popular show this week, this month, in a genre, any other popularity category, or any combination thereof.

In some embodiments, a media guidance application may determine that a user is not subscribed to a channel associated with a most popular show. In some embodiments, this determination may be indicated with a visual attribute. For example, a media guidance application may apply a red backlight or a green backlight to the listing, background, or both, that indicates that the user can't access (e.g., red backlight) or can access (e.g., green backlight) the content. The user can click on the popular show to jump directly to the channel, if the user is subscribed. Textual information would also be provided for colorblind users. In some embodiments, media guidance application may apply a visual attribute to indicate a user's access to content in addition to applying a visual attribute to indicate a proximity to popular content.

Figure 7:
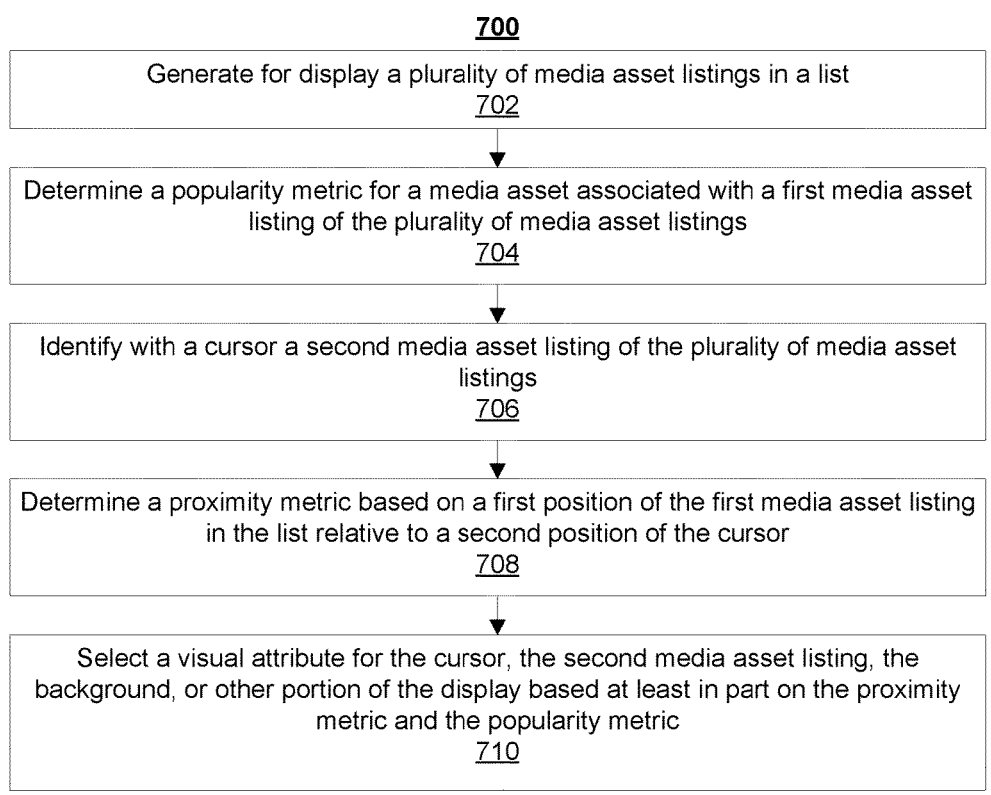
FIG. 7 is a flowchart of an illustrative process for indicating popular content, in accordance with some embodiments of the disclosure.

FIG. 7 is a flowchart of an illustrative process 700 for indicating popular content, in accordance with some embodiments of the disclosure. For example, a media guidance application may instruct control circuitry 604 to execute the elements of process 700.

It should be noted that process 700 or any step thereof could be performed on, or provided by, any of the devices shown in FIGS. 5-6. For example, process 708 may be executed by control circuitry 506 (FIG. 5) as instructed by a media guidance application implemented on a user device (e.g., user equipment devices 602, 604, and/or 606 (FIG. 6)) in order to determine a proximity metric based on a first position of a first media asset listing in a list relative to a second position of a cursor. In addition, one or more steps of process 700 may be incorporated into or combined with one or more steps of any other process or embodiment described herein.

Step 702 may include a media guidance application generating for display a plurality of media asset listings in a list. For example, a media guidance application may use control circuitry 604 to generate a display on display 512. In some embodiments, all of the plurality of media asset listings may be displayed at a single time. For example, a plurality of media asset listings may include five sitcoms, and the five media asset listings may be visible on display 512 without scrolling. In some embodiments, only a portion of a plurality of media asset listings may be displayed at a single time. For example, a plurality of media asset listings may include five sitcoms, and only four of the five media asset listings may be visible on display 512 at a time. Further, the display may need to change to show the fifth, originally not displayed, media asset listing. For example, referencing FIGS. 1A and 1B, listing 102 is a most popular listing and is displayed in display screen 100, but not displayed in display screen 140.

Step 704 may include a media guidance application determining a popularity metric for a media asset associated with a first media asset listing of a plurality of media asset listings. In some embodiments, the media guidance application may determine the popularity metric using control circuitry 604. In some embodiments, a media guidance application may, using control circuitry 604, access media guidance data source 618 for popularity information. For example, a media guidance application may determine which media asset listing of the plurality of media asset listings is the most popular. Accordingly, in this example, the popularity metric would be "most popular", "top ranked" media asset in popularity, a highest popularity score, or other metric indicating that the media asset is relatively more popular than the other media assets of the plurality of media assets.

Step 706 may include a media guidance application identifying, with a cursor, a second media asset listing of the plurality of media asset listings. In some embodiments, a media guidance application may receive input from a user navigating the cursor to move among listings, indicate listings of interest, select listings, or otherwise navigate displayed listings. In some embodiments, the media guidance application may identify a position corresponding to a cursor, and the position may correspond to a media asset listing. For example, reference FIG. 1B, the media guidance application may identify "Friends" as the second media asset listing based on cursor positioning highlight region 110.

Step 708 may include a media guidance application determining a proximity metric based on a first position of the first media asset listing in the list relative to a second position of the cursor. For example, the second position of the cursor may correspond to the location of the second media asset listing. In some circumstances, the first media asset listing may be displayed, although it need not be. For example, referencing FIG. 1B, the listing for "The Simpsons" is not displayed, although it may be the most popular. The proximity metric may include a measure of how far apart or close the first position and second position are. For example, the proximity metric provides a measure of how close the cursor is to the most popular content. Further details regarding a proximity metric are discussed in the context of FIG. 10.

Step 710 may include a media guidance application selecting a visual attribute for the cursor, the second media asset listing, the background, any other suitable portion of a display, or any combination thereof, based at least in part on the proximity metric and the popularity metric. In some embodiments, selecting a visual attribute may include selecting a cursor color selecting a listing color, selecting a background color, selecting a plurality of listing colors, selecting a color map, selecting a pattern, selecting an icon, selecting any other suitable visual attribute, or any combination thereof. Step 710 may include a media guidance application selecting from among a plurality of types of visual attributes (e.g., a color, a shape, or an icon), or selecting a visual attribute within a single type of visual attribute (e.g., a particular color from a color palette).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

Figure 8:
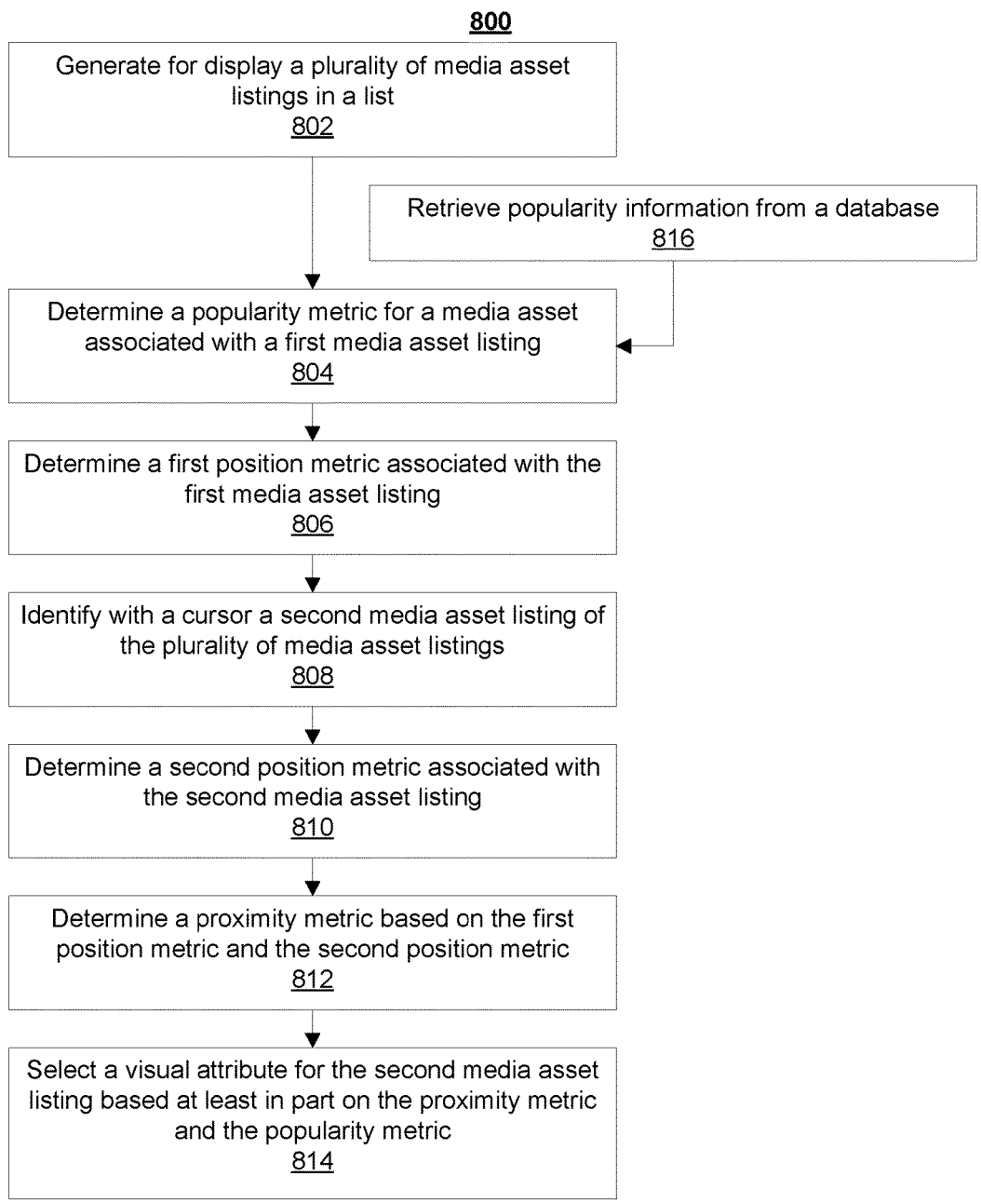
FIG. 8 is a flowchart of an illustrative process for indicating popular content, in accordance with some embodiments of the disclosure.

FIG. 8 is a flowchart of an illustrative process 800 for indicating popular content, in accordance with some embodiments of the disclosure. For example, a media guidance application may instruct control circuitry 604 to execute the elements of process 800.

It should be noted that process 800 or any step thereof could be performed on, or provided by, any of the devices shown in FIGS. 5-6. For example, process 802 may be executed by control circuitry 506 (FIG. 5) as instructed by a media guidance application implemented on a user device (e.g., user equipment devices 602, 604, and/or 606 (FIG. 6)) in order to generate for display a plurality of media asset listings in a list. In addition, one or more steps of process 800 may be incorporated into or combined with one or more steps of any other process or embodiment described herein.

Step 802 may include a media guidance application generating for display a plurality of media asset listings in a list. For example, a media guidance application may use control circuitry 604 to generate a display on display 512. In some embodiments, all of the plurality of media asset listings may be displayed at a single time. For example, a plurality of media asset listings may include five sitcoms, and the five media asset listings may be visible on display 512 without scrolling. In some embodiments, only a portion of a plurality of media asset listings may be displayed at a single time. For example, a plurality of media asset listings may include five sitcoms, and only four of the five media asset listings may be visible on display 512 at a time. Further, the display may need to change to show the fifth, originally not displayed, media asset listing. For example, referencing FIGS. 1A and 1B, listing 102 is a most popular listing and is displayed in display screen 100, but not displayed in display screen 140.

Step 804 may include a media guidance application determining a popularity metric for a media asset associated with a first media asset listing. In some embodiments, the media guidance application may retrieve popularity information from a database, shown as step 816 in flowchart 800. Step 804 may include a media guidance application determining a popularity metric for a media asset associated with a first media asset listing of a plurality of media asset listings. In some embodiments, the media guidance application may determine the popularity metric using control circuitry 604. In some embodiments, a media guidance application may, using control circuitry 604, access media guidance data source 618 for popularity information. For example, a media guidance application may determine which media asset listing of the plurality of media asset listings is the most popular. Accordingly, in this example, the popularity metric would be "most popular", "top ranked" media asset in popularity, a highest popularity score, or other metric indicating that the media asset is relatively more popular than the other media assets of the plurality of media assets.

Step 806 may include a media guidance application determining a first position metric associated with the first media asset listing. A first position metric may be an absolute spatial position, a relative spatial position, an absolute listing position, a relative listing position, a relative location based on another object (e.g., to the left of a video region, above a cursor), any other suitable position metric, or any combination thereof. In some embodiments, a position metric associated with a first media asset listing may include a position on a display screen of listings. For example, display screen 100 of FIG. 1A shows a displayed first media asset listing 102. In some embodiments, a position metric associated with a first media asset listing may include a position that is not displayed. For example, display screen 140 of FIG. 1A does not display first media asset listing 102. When not displayed, the position of a first media asset listing may, for example, correspond to an equivalent position of the listing if the display were big enough to display the first media asset listing. In a further example, the position of the first media asset listing may be its position in a list of media asset listings. In a further example, the position of the first media asset listing may be its coordinates among a list of media asset listings.

Step 808 may include a media guidance application identifying, with a cursor, a second media asset listing of the plurality of media asset listings. In some embodiments, a media guidance application may receive input from a user navigating the cursor to move among listings, indicate listings of interest, select listings, or otherwise navigate displayed listings. In some embodiments, the media guidance application may identify a position corresponding to a cursor, and the position may correspond to a media asset listing. For example, reference FIG. 1B, the media guidance application may identify "Friends" as the second media asset listing based on cursor positioning highlight region 110.

Step 810 may include a media guidance application determining a second position metric associated with the second media asset listing. A second position metric may be an absolute spatial position, a relative spatial position, an absolute listing position, a relative listing position, a relative location based on another object (e.g., to the left of a video region, above a cursor), any other suitable position metric, or any combination thereof. In some embodiments, a position metric associated with a second media asset listing may include a position on a display screen of listings. For example, display screen 140 of FIG. 1B shows a displayed second media asset listing 146. In a further example, the position of the second media asset listing may be its position in a list of media asset listings. In a further example, the position of the second media asset listing may be its coordinates among a list of media asset listings.

Step 812 may include a media guidance application determining a proximity metric based on the first position metric and the second position metric. In some circumstances, the first media asset listing may be displayed, although it need not be. For example, referencing FIG. 1B, the listing for "The Simpsons" is not displayed, although it may be the most popular. The proximity metric may include a measure of how far apart or close the first position and second position are. For example, the proximity metric provides a measure of how close the cursor is to the most popular content. Further details regarding determining a proximity metric, as well as illustrative examples of proximity metrics, are discussed in the context of FIG. 10.

Step 814 may include a media guidance application selecting a visual attribute for the second media asset listing based at least in part on the proximity metric and the popularity metric. Step 814 may include any of the illustrative processes of step 710 of flowchart 700.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
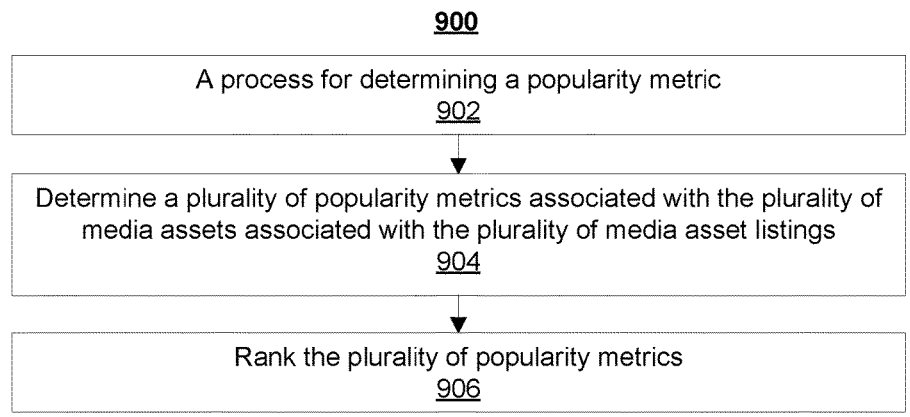
FIG. 9 is a flowchart of an illustrative process for determining a popularity metric, in accordance with some embodiments of the disclosure.

FIG. 9 is a flowchart of an illustrative process 900 for determining a popularity metric, in accordance with some embodiments of the disclosure. For example, a media guidance application may instruct control circuitry 604 to execute the elements of process 900.

It should be noted that process 900 or any step thereof could be performed on, or provided by, any of the devices shown in FIGS. 5-6. For example, process 904 may be executed by control circuitry 506 (FIG. 5) as instructed by a media guidance application implemented on a user device (e.g., user equipment devices 602, 604, and/or 606 (FIG. 6)) in order to determine a plurality of popularity metrics associated with a plurality of media asset associated with a plurality of media asset listings. In addition, one or more steps of process 900 may be incorporated into or combined with one or more steps of any other process or embodiment described herein.

Step 902 may include a process for determining a popularity metric. Step 902 may include step 904, which may include a media guidance application determining a plurality of popularity metrics associated with a plurality of media assets associated with a plurality of media asset listings. Step 906 may include a media guidance application ranking the plurality of popularity metrics of step 904. For example, a media guidance application may receive population information including a number of views for each of a plurality of programs. Based on the number of views, the media guidance application may determine a score or other measure of popularity, and rank the programs in order of popularity. Accordingly, the relative popularity of the plurality of programs may be determined. Further, the most popular program, or programs, may be identified. In some embodiments, a visual attribute may be selected based at least in part on the result of step 906. For example, a color of each media asset listing may depend on the ranking, with more popular listings having a brighter, warmer, or otherwise more intense appearance. The color of a listing may be visible when the listing is highlighted (e.g., by highlight region 310), all the time, when other listings are highlighted, any other suitable time, or any combination thereof.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
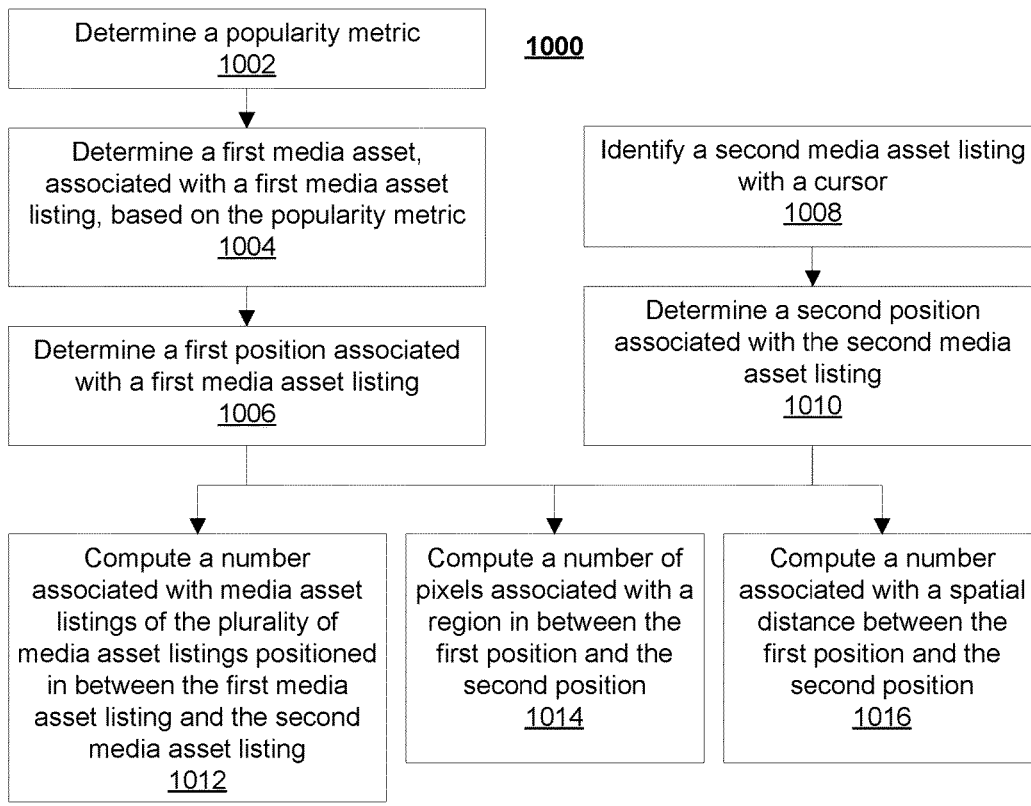
FIG. 10 is a flowchart of an illustrative process for determining a proximity metric, in accordance with some embodiments of the disclosure.

FIG. 10 is a flowchart of an illustrative process 1000 for determining a proximity metric, in accordance with some embodiments of the disclosure. For example, a media guidance application may instruct control circuitry 604 to execute the elements of process 1000.

It should be noted that process 1000 or any step thereof could be performed on, or provided by, any of the devices shown in FIGS. 5-6. For example, process 1002 may be executed by control circuitry 506 (FIG. 5) as instructed by a media guidance application implemented on a user device (e.g., user equipment devices 602, 604, and/or 606 (FIG. 6)) in order to determine a popularity metric. In addition, one or more steps of process 1000 may be incorporated into or combined with one or more steps of any other process or embodiment described herein.

Step 1002 may include a media guidance application determining a popularity metric. For example, the popularity metric may include a most popular media asset in a category, a most highly ranked media asset, a most searched for media asset, a most popular media asset among a group of media assets, any other suitable popularity metric, or any combination thereof. In some embodiments, a media guidance application may, using control circuitry 604, access media guidance data source 618 for popularity information. For example, a media guidance application may determine which media asset listing of the plurality of media asset listings is the most popular. Accordingly, in this example, the popularity metric would be "most popular", "top ranked" media asset in popularity, a highest popularity score, or other metric indicating that the media asset is relatively more popular than the other media assets of the plurality of media assets.

Step 1004 may include a media guidance application determining a first media asset based on the popularity metric determined at step 1002. In some embodiments, a first media asset may be a "most popular", "top ranked" media asset in popularity, a highest popularity score, or other metric indicating that the media asset is relatively more popular than the other media assets of the plurality of media assets.

Step 1006 may include a media guidance application determining a first position associated with the first media asset listing determined in step 1004. In some embodiments, the first position may include an absolute or relative spatial position. In some embodiments, the first position may include an absolute or relative position in a list. For example, determining a first position may include determining that a media asset listing is tenth in a list of fifty listings. In a further example, determining a first position may include determining that a media asset listing is located at 100 pixels from the bottom, and 200 pixels from the rightmost edge, of a display screen. A media guidance application may determine any suitable measure of position in accordance with step 1006.

Step 1008 may include a media guidance application identifying a second media asset listing with a cursor. For example, highlight region 310 may be moved onto the second media asset listing. In some embodiments, a media guidance application may receive input from a user navigating the cursor to move among listings, indicate listings of interest, select listings, or otherwise navigate displayed listings. In some embodiments, the media guidance application may identify a position corresponding to a cursor, and the position may correspond to a media asset listing. For example, reference FIG. 1B, the media guidance application may identify "Friends" as the second media asset listing based on cursor positioning highlight region 110.

Step 1010 may include a media guidance application determining a second position associated with the second media asset listing identified in step 1008. In some embodiments, the second position may include an absolute or relative spatial position. In some embodiments, the second position may include an absolute or relative position in a list. For example, determining a second position may include determining that a media asset listing is twelfth in a list of fifty listings. In a further example, determining a second position may include determining that a media asset listing is located at 200 pixels from the bottom, and 200 pixels from the rightmost edge, of a display screen. A media guidance application may determine any suitable measure of position in accordance with step 1010.

Step 1012 may include a media guidance application computing a number associated with media asset listings of the plurality of media asset listings positioned in between the first media asset listing and the second media asset listing. For example, the media guidance application may determine the first media asset listing to be number ten out of fifty listings (e.g., a position ten), the second media asset listing to be number fifteen out of the fifty listings (e.g., a position 15), and compute a number four as the number of listings in between the first media asset listing and second media asset listing. In a further example, the media guidance application may determine the first media asset listing to be number ten out of fifty listings (e.g., a position ten), the second media asset listing to be number fifteen out of the fifty listings (e.g., a position 15), that the listings are arranged in two columns of 25 listings (e.g., counting down, with number 1 at the upper left and number 50 at the lower right) and compute a number two as the number of listings in between the first media asset listing and second media asset listing. Media asset listings may be positioned in any suitable arrangement, and accordingly, the number of listings in between two listings may depend on the particular arrangement displayed.

Step 1014 may include a media guidance application computing a number of pixels associated with a region in between the first position and the second position. For example, the media guidance application may determine the first media asset listing to be located at 100 pixels down from the top and 50 pixels from the left edge, the second media asset listing to be located at 500 pixels down and 50 pixels from the left, and compute a number of pixels of 450 as the number of pixels in between the first media asset listing and second media asset listing. A number of pixels between a first media asset listing and a second media asset listing may depend on a display screen size, display screen resolution, display screen aspect ratio, any other suitable property of a display screen, or any combination thereof.

Step 1016 may include a media guidance application computing a number associated with a spatial distance between the first position and the second position. A spatial distance between media asset listings may be measured along any suitable path including. For example, the media guidance application may determine the first media asset listing to be located at 10 cm pixels down from the top and 5 cm from the left edge, the second media asset listing to be located at 50 cm down and 25 cm pixels from the left, and compute a spatial distance of $((50-10)^2+(25-5)^2)^{0.5} \approx 45$ cm (e.g., following a diagonal path) as the spatial distance in between the first media asset listing and second media asset listing. Further, in an example having the same first and second positions, the media guidance application may compute a spatial distance as $(50-10)+(25-5) \approx 60$ cm (e.g., following horizontal and vertical paths only). A spatial distance between a first media asset listing and a second media asset listing may depend on a display screen size, display screen resolution, display screen aspect ratio, any other suitable property of a display screen, or any combination thereof.

Steps 1012, 1014, and 1016 represent several examples of determining a proximity metric. It will be understood that the illustrative computations described in the context of steps 1012, 1014, 1016 of flowchart 1000 may be combined in any suitable way to determine a proximity metric. In some embodiments, a computed number from, for example, steps 1012, 1014, or 1016 may be used to determine a further proximity metric. For example, a spatial distance may be computed, and compared to one or more thresholds to determine a further proximity metric. In an illustrative example, a computed number may be compared to a single threshold, and accordingly the proximity metric may be "near" (e.g., computed number less than threshold) or "far" (e.g., computed number greater than threshold). Any of steps 1012, 1014, 1016 may include computing a number associated with a difference in a first position and a second position.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

Figure 11:
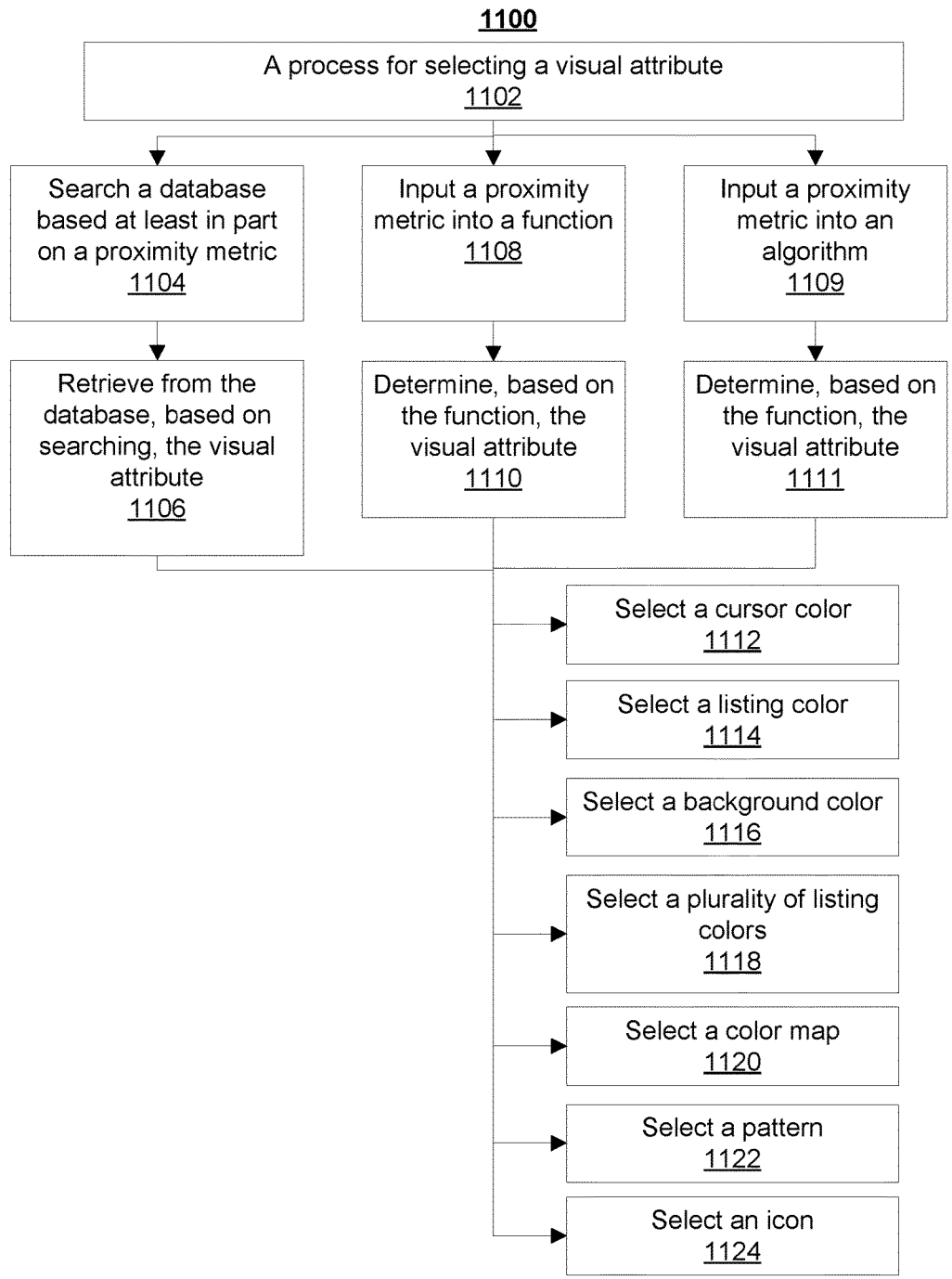
FIG. 11 is a flowchart of an illustrative process for determining a visual attribute, in accordance with some embodiments of the disclosure.

FIG. 11 is a flowchart of an illustrative process 1100 for determining a visual attribute, in accordance with some embodiments of the disclosure. For example, a media guidance application may instruct control circuitry 604 to execute the elements of process 1100.

It should be noted that process 1100 or any step thereof could be performed on, or provided by, any of the devices shown in FIGS. 5-6. For example, process 1112 may be executed by control circuitry 506 (FIG. 5) as instructed by a media guidance application implemented on a user device (e.g., user equipment devices 602, 604, and/or 606 (FIG. 6)) in order to select a cursor color. In addition, one or more steps of process 1100 may be incorporated into or combined with one or more steps of any other process or embodiment described herein.

Step 1102 may include a process for selecting a visual attribute.

Step 1104 may include a media guidance application searching a database based at least in part on a proximity metric. Step 1106 may include a media guidance application retrieving from a database, based on a search, a visual attribute. In some embodiments, a media guidance application may transmit information including a proximity metric to a database, and retrieve from the database a visual attribute to apply. In some embodiments, control circuitry 506 may include the database. In some embodiments, storage 508 may include the database. In some embodiments, media guidance data source 618 may include the database. For example, a media guidance application may transmit a query to the database, using a proximity metric as an input (e.g., a second media asset listing is within two listings of a popular listing). In a further example, the database may include a plurality of key-value pairs, wherein a media guidance application may input a key (e.g., a proximity metric value) and retrieve a value (e.g., a visual attribute). The database may perform at least some processing, including a reply, for example, with a visual attribute such as a color (e.g., orange). In some embodiments, a media guidance application may perform the search and retrieval. For example, storage 508 may include a database, and a media guidance application may parse the database to find a visual attribute that corresponds to a determined proximity metric. A media guidance application may provide a number, a string, a message, a code, any other suitable information, or any combination thereof to search the database based on a determined proximity metric.

Step 1108 may include a media guidance application inputting a proximity metric into a function. Step 1110 may include a media guidance application determining a visual attribute based on the function. In some embodiments, a media guidance application may determine a function (e.g., generate a function, receive function from user input), which outputs a proximity metric based on listing position as an input. To illustrate for a mosaic display, such as display screen 200 shown in FIG. 2A, a media guidance application may determine a function that takes as input a proximity metric for a first media asset listing (i.e., popular content) and a second media asset listing (e.g., corresponding to a cursor position), and determines a visual attribute. A function may be continuous or discreet, and include polynomial (including polynomials of order 0 and 1), exponential, logarithmic, any other suitable mathematical expression, or any combination thereof. For example, a function may include a directly proportional relationship between a distance number (a proximity metric) and a transparency (a visual attribute), wherein the lesser the distance number (i.e., the closer the listing to popular content), the lesser the transparency of the listing. In some embodiments, a media guidance application may determine a popularity spatial field, and accordingly a spatial field for visual attributes. For example, a spatial field may be determined for visual attributes using popularity as a source term. Accordingly, one or more popular listings, each with an associated popularity metric, may be used as source terms. In such circumstances, as a media guidance application receives input from a user navigating media asset listings the media guidance application may apply visual attributes based on the function (e.g., as a media guidance application receives input from a user navigating to a popular listing, the visual attribute intensifies).

Step 1109 may include a media guidance application inputting a proximity metric into an algorithm. Step 1111 may include a media guidance application determining a visual attribute based on the algorithm. In some embodiments, an algorithm may include a function, a logical expression, a comparison to a threshold, any other suitable mathematical expression, or any combination thereof. For example, a media guidance application may use a collection of consecutive intervals to classify one or more proximity metrics. The classification may be associated with a visual attribute. For example, classification may include "within 1 listing," near, far, and remote, and accordingly, respective visual attributes may include a color red, a color orange, a color yellow, and a color blue.

Step 1112 may include a media guidance application selecting a cursor color. In some embodiments, a cursor may include a highlight or other visual indicator having a color. For example, highlight region 310 may have an associated color as a border around a displayed media asset listing. In a further example, a cursor may include some other visual indicator such as a shape, or overlay, that has an associated color. In some embodiments, a cursor may include an icon, which a media guidance application may move about a display screen based on receiving user input from a user input device (e.g., a mouse, keyboard or other pointing object). Accordingly, the icon may have a color associated with it, and the media guidance application may manage a visual attribute of the icon in accordance with the present disclosure. A color, as described in the context of flowchart 1100, may include any suitable hue, from any suitable color-scale. For example, the color may be selected from a group of grayscale colors, a group of RGB colors, any other color map, or any combination thereof. Further, a media guidance application may use variables including hue (e.g., 0-360), saturation (e.g., 0-100), and luminance (e.g., 0-100) to specify a color. A media guidance application may select a color for a cursor based on the proximity metric. For example, a media guidance application may select a relatively warm color for the cursor, for a cursor position relatively near to popular content.

Step 1114 may include a media guidance application selecting a media asset listing color. In some embodiments, a listing may have an associated color. For example, a listing may have an associated fill color (e.g., local background color), edge color (e.g., border color), text color, or any combination thereof. A media guidance application may select a color for a media asset listing based on the proximity metric. For example, a media guidance application may select a relatively cool color for the listing, for a listing position relatively far from popular content. In a further example, a media guidance application may select a relatively warm color for the listing, for a cursor position relatively near to popular content.

Step 1116 may include a media guidance application selecting a background color. In some embodiments, a suitable portion of a display screen background may have an associated color. The term background, as used in the context of FIG. 1100, refers to portions of a display screen not associated with a cursor position. For example, referencing FIG. 3, program information region 312, video region 322, options region 324, listing 314, listing 316, listing 318, any other portion of a display screen that may be considered background, or any combination thereof may have an associated fill color, edge color, text color, or any combination thereof. For example, a media guidance application may select a relatively warm color for at least a portion of the background, for a cursor position relatively near to popular content.

Step 1118 may include a media guidance application selecting a plurality of listing colors. In some embodiments, a media guidance application may select a plurality of colors each corresponding to a respective listing of a plurality of listings. In some embodiments, a media guidance application may select a single color for a plurality of listings (e.g., all listings of the plurality of listing have the same color). In some embodiments, a media guidance application may group listings into one or more groups, and select a color for each group. For example, a media guidance application may group a plurality of listings into one or more groups based on a proximity metric (e.g., each group includes listings of similar proximity metrics), and select a color for each group based on the proximity metric (e.g., groups nearer to popular content are colored with warmer colors).

Step 1120 may include a media guidance application selecting a color map. In some embodiments, a media guidance application may select a color map based on popularity information. For example, a media guidance application may determine that a first media asset is associated with a large popularity metric (e.g., very popular), and accordingly may select a relatively warmer color map. In some embodiments, a color map may include a collection of shades, a collection of tones, a palette, a plurality of colors, or any combination thereof. In some embodiments, a color map may include one or more colors corresponding to different regions, different entities (e.g., cursors, listings, background), different popularity metric values, different proximity metric values, or any combination thereof.

Step 1122 may include a media guidance application selecting a pattern. A pattern may include a line type, a line shape, a fill type, a design, an image, any other suitable graphic, or any combination thereof. In some embodiments, a pattern may have one or more associated colors.

Step 1124 may include a media guidance application selecting an icon. An icon may include an image, a shape, an irregular design, any other suitable graphic, or any combination thereof. For example, an icon may include an arrow, a star, a polygon, a cartoon, or a hand. In some embodiments, an icon may have one or more associated colors. In some embodiments, a media guidance application may change an icon (e.g., shape, size, orientation, color) in response to a change in a proximity metric.

In some embodiments, the illustrative steps of flowchart 1100 may be performed independent of a cursor. For example, listings may be displayed with respective applied visual attributes based on proximity to one or more popular listings, regardless of cursor position. For example, a proximity metric may be based on a first position of a first media asset listing, and a second position of a second media asset listing, regardless of cursor position.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

Figure 12:
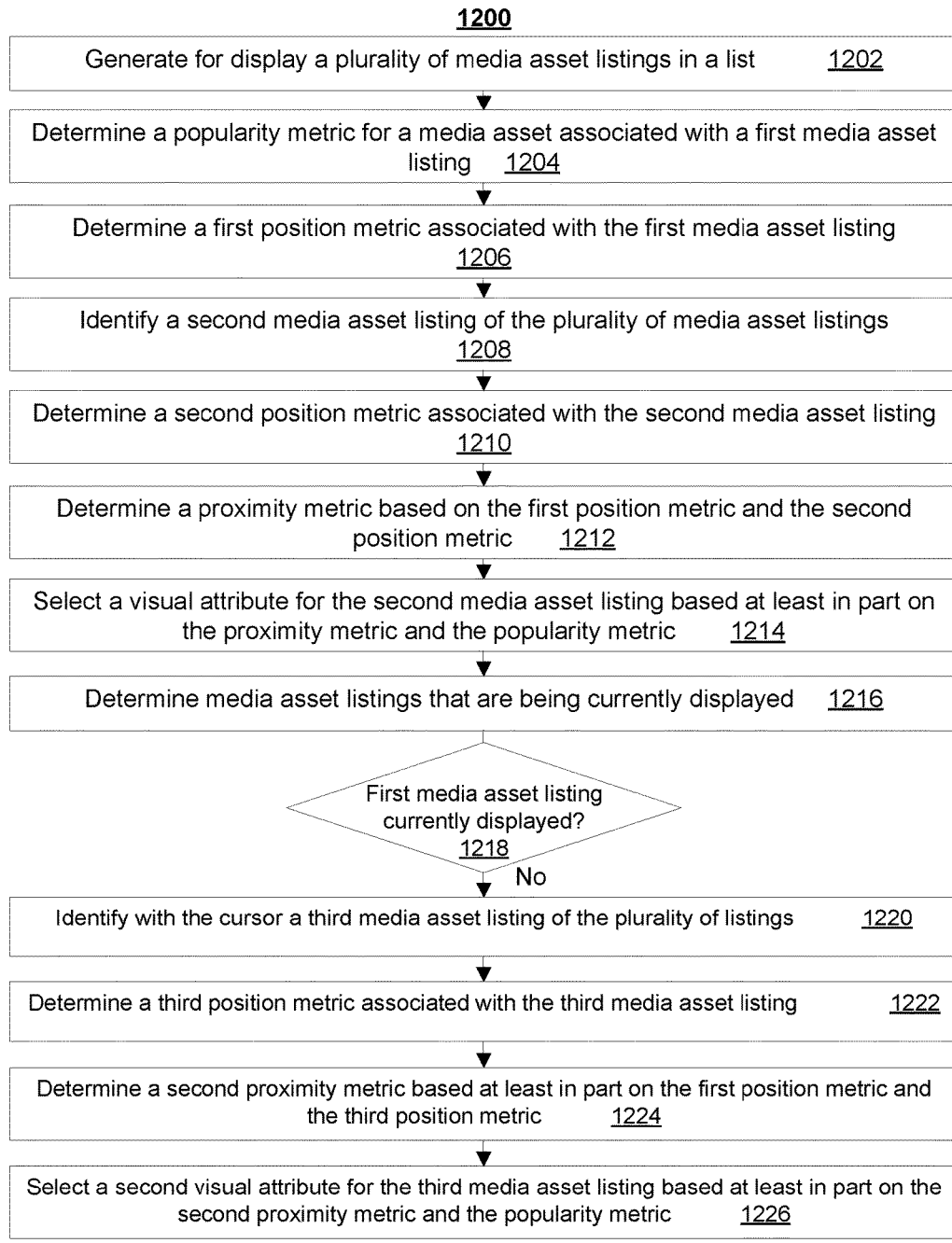
FIG. 12 is a flowchart of an illustrative process for indicating popular content, in accordance with some embodiments of the disclosure.

FIG. 12 is a flowchart of an illustrative process 1200 for indicating popular content, in accordance with some embodiments of the disclosure. For example, a media guidance application may instruct control circuitry 604 to execute the elements of process 1200.

It should be noted that process 1200 or any step thereof could be performed on, or provided by, any of the devices shown in FIGS. 5-6. For example, process 1202 may be executed by control circuitry 506 (FIG. 5) as instructed by a media guidance application implemented on a user device (e.g., user equipment devices 602, 604, and/or 606 (FIG. 6)) in order to generate for display a plurality of media asset listings in a list. In addition, one or more steps of process 1200 may be incorporated into or combined with one or more steps of any other process or embodiment described herein.

Step 1202 may include a media guidance application generating for display a plurality of media asset listings in a list. For example, a media guidance application may use control circuitry 604 to generate a display on display 512. In some embodiments, all of the plurality of media asset listings may be displayed at a single time. For example, a plurality of media asset listings may include five sitcoms, and the five media asset listings may be visible on display 512 without scrolling. In some embodiments, only a portion of a plurality of media asset listings may be displayed at a single time. For example, a plurality of media asset listings may include five sitcoms, and only four of the five media asset listings may be visible on display 512 at a time. Further, the display may need to change to show the fifth, originally not displayed, media asset listing. For example, referencing FIGS. 1A and 1B, listing 102 is a most popular listing and is displayed in display screen 100, but not displayed in display screen 140.

Step 1204 may include a media guidance application determining a popularity metric for a media asset associated with a first media asset listing. In some embodiments, the media guidance application may retrieve popularity information from a database, shown as step 816 in flowchart 800. Step 804 may include a media guidance application determining a popularity metric for a media asset associated with a first media asset listing of a plurality of media asset listings. In some embodiments, the media guidance application may determine the popularity metric using control circuitry 604. In some embodiments, a media guidance application may, using control circuitry 604, access media guidance data source 618 for popularity information. For example, a media guidance application may determine which media asset listing of the plurality of media asset listings is the most popular. Accordingly, in this example, the popularity metric would be "most popular", "top ranked" media asset in popularity, a highest popularity score, or other metric indicating that the media asset is relatively more popular than the other media assets of the plurality of media assets.

Step 1206 may include a media guidance application determining a first position metric associated with the first media asset listing. A first position metric may be an absolute spatial position, a relative spatial position, an absolute listing position, a relative listing position, a relative location based on another object (e.g., to the left of a video region, above a cursor), any other suitable position metric, or any combination thereof. In some embodiments, a position metric associated with a first media asset listing may include a position on a display screen of listings. For example, display screen 100 of FIG. 1A shows a displayed first media asset listing 102. In some embodiments, a position metric associated with a first media asset listing may include a position that is not displayed. For example, display screen 140 of FIG. 1A does not display first media asset listing 102. When not displayed, the position of a first media asset listing may, for example, correspond to an equivalent position of the listing if the display were big enough to display the first media asset listing. In a further example, the position of the first media asset listing may be its position in a list of media asset listings. In a further example, the position of the first media asset listing may be its coordinates among a list of media asset listings.

Step 1208 may include a media guidance application identifying, with a cursor, a second media asset listing of the plurality of media asset listings. In some embodiments, a media guidance application may receive input from a user navigating the cursor to move among listings, indicate listings of interest, select listings, or otherwise navigate displayed listings. In some embodiments, the media guidance application may identify a position corresponding to a cursor, and the position may correspond to a media asset listing. For example, reference FIG. 1B, the media guidance application may identify "Friends" as the second media asset listing based on receiving input from a user input device that moves a cursor which positions highlight region 110.

Step 1210 may include a media guidance application determining a second position metric associated with the second media asset listing. A second position metric may be an absolute spatial position, a relative spatial position, an absolute listing position, a relative listing position, a relative location based on another object (e.g., to the left of a video region, above a cursor), any other suitable position metric, or any combination thereof. In some embodiments, a position metric associated with a second media asset listing may include a position on a display screen of listings. For example, display screen 140 of FIG. 1B shows a displayed second media asset listing 146. In a further example, the position of the second media asset listing may be its position in a list of media asset listings. In a further example, the position of the second media asset listing may be its coordinates among a list of media asset listings.

Step 1212 may include a media guidance application determining a proximity metric based on the first position metric and the second position metric. For example, referencing FIG. 1B, the listing for "The Simpsons" is not displayed, although it may be the most popular. The proximity metric may include a measure of how far apart or close the first position and second position are. For example, the proximity metric provides a measure of how close the cursor is to the most popular content. Further details regarding a proximity metric are discussed in the context of FIG. 10. For example, step 1212 may include a media guidance application computing a number associated with media asset listings of the plurality of media asset listings positioned in between the first media asset listing and the second media asset listing. In a further example, step 1212 may include a media guidance application computing a number of pixels associated with a region in between the first position and the second position. In a further example, step 1212 may include a media guidance application computing a number associated with a spatial distance between the first position and the second position.

Step 1214 may include a media guidance application selecting a visual attribute for the second media asset listing based at least in part on the proximity metric and the popularity metric. In some embodiments, selecting a visual attribute may include selecting a cursor color selecting a listing color, selecting a background color, selecting a plurality of listing colors, selecting a color map, selecting a pattern, selecting an icon, selecting any other suitable visual attribute, or any combination thereof. Step 1214 may include a media guidance application selecting from among a plurality of types of visual attributes (e.g., a color, a shape, or an icon), or selecting a visual attribute within a single type of visual attribute (e.g., a particular color from a color palette).

Step 1216 may include a media guidance application determining media asset listings that are being currently displayed. In some embodiments, a portion of the plurality of media asset listings may be displayed at a given instance. For example, for a relatively large number of listings, a media guidance application may receive input from a user navigating a display screen that does not include a most popular media asset listing. In some such circumstances, a user may benefit from an indication of where popular listings can be located. In some embodiments, a media guidance application may determine which listings of a plurality of listings are displayed after any change to the display screen.

Step 1218 may include a media guidance application determining whether the first media asset listing is currently displayed. For example, a popularity metric may be determined for a first media asset, which may be included in the plurality of media assets but, in some instances, is not displayed.

Step 1220 may include a media guidance application identifying with a cursor a third media asset listing of the plurality of listings. In some embodiments, the third media asset listing may be determined based at least in part on the relative position of the first media asset listing and the second media asset listing. For example, if the first media asset listing is not displayed, but may be navigated to by moving up in the plurality of listings (e.g., receiving a user input using a navigation button), the third media asset listing may be the upward-most listing that is displayed, to guide the user and indicate popular content is upward in the list. To illustrate, referencing FIG. 1B, listing 144 may be the third media asset listing, because the most popular listing 102 is not displayed but is located upwards in the list.

Step 1222 may include a media guidance application determining a third position metric associated with the third media asset listing. A media guidance application may determine the third position metric using any of the disclosed techniques.

Step 1224 may include a media guidance application determining a second proximity metric based at least in part on the first position metric and the third position metric. A media guidance application may determine the second proximity metric using any of the disclosed techniques such as, for example, those described in the context of FIG. 10.

Step 1226 may include a media guidance application selecting a second visual attribute for the third media asset listing based at least in part on the second proximity metric and the popularity metric. A media guidance application may determine the second proximity metric using any of the disclosed techniques such as, for example, those described in the context of FIG. 11 and FIG. 13.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 12.

Figure 13:
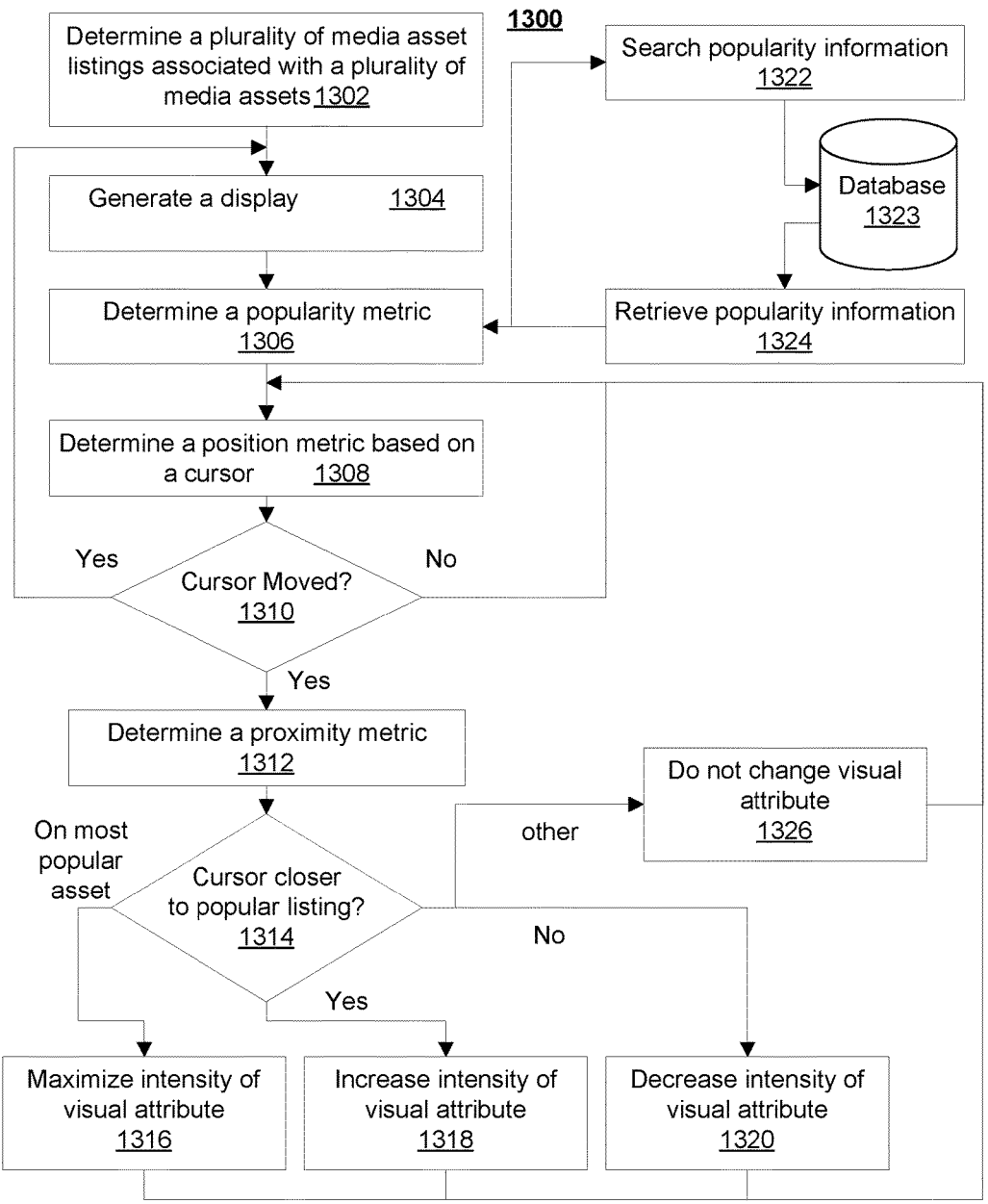
FIG. 13 is a flowchart of an illustrative process for indicating popular content, in accordance with some embodiments of the disclosure.

FIG. 13 is a flowchart of an illustrative process 1300 for indicating popular content, in accordance with some embodiments of the disclosure. For example, a media guidance application may instruct control circuitry 604 to execute the elements of process 1300.

It should be noted that process 1300 or any step thereof could be performed on, or provided by, any of the devices shown in FIGS. 5-6. For example, process 1302 may be executed by control circuitry 506 (FIG. 5) as instructed by a media guidance application implemented on a user device (e.g., user equipment devices 602, 604, and/or 606 (FIG. 6)) in order to determine a plurality of media asset listings associated with a plurality of media assets. In addition, one or more steps of process 1300 may be incorporated into or combined with one or more steps of any other process or embodiment described herein.

Step 1302 may include a media guidance application determining a plurality of media asset listings associated with a plurality of media assets.

Step 1304 may include a media guidance application generating a display. For example, a media guidance application may generate any of displays 100, 150, 160, or 180 of FIGS. 1A, 1B, 1C, and 1D, respectively. Step 1304 may include a media guidance application generating for display a plurality of media asset listings in a list. For example, a media guidance application may use control circuitry 604 to generate a display on display 512. In some embodiments, all of the plurality of media asset listings may be displayed at a single time. For example, a plurality of media asset listings may include five sitcoms, and the five media asset listings may be visible on display 512 without scrolling. In some embodiments, only a portion of a plurality of media asset listings may be displayed at a single time. For example, a plurality of media asset listings may include five sitcoms, and only four of the five media asset listings may be visible on display 512 at a time. Further, the display may need to change to show the fifth, originally not displayed, media asset listing. For example, referencing FIGS. 1A and 1B, listing 102 is a most popular listing and is displayed in display screen 100, but not displayed in display screen 140.

Step 1306 may include a media guidance application determining a popularity metric. Step 1306 may include a media guidance application determining a popularity metric for a media asset associated with a first media asset listing. In some embodiments, the media guidance application may search a database 1323, and retrieve popularity information from database 1324, shown as steps 1322 and 1324 of flowchart 1300. In some embodiments, step 1306 may include a media guidance application determining a popularity metric for a media asset associated with a first media asset listing of a plurality of media asset listings. In some embodiments, the media guidance application may determine the popularity metric using control circuitry 604. In some embodiments, a media guidance application may, using control circuitry 604, access media guidance data source 618 for popularity information. For example, a media guidance application may determine which media asset listing of the plurality of media asset listings is the most popular. Accordingly, in this example, the popularity metric would be "most popular", "top ranked" media asset in popularity, a highest popularity score, or other metric indicating that the media asset is relatively more popular than the other media assets of the plurality of media assets.

Step 1322 may include a media guidance application searching popularity information stored in database 1323. Step 1324 may include a media guidance application retrieving popularity information stored in database 1323. In some embodiments, database 1323 may be included in media guidance data source 618. In some embodiments, database 1323 may be included in control circuitry 604. In some embodiments, database 1323 may be a remote server, different from media guidance data source 618 or control circuitry 604. Database 1323 may include any suitable hardware, software, or both that may be searched, be queried, provide popularity information, provide other suitable information, or otherwise suitably communicate with a media guidance application.

Step 1308 may include a media guidance application determining a position metric based on a cursor. A position metric may be an absolute spatial position, a relative spatial position, an absolute listing position, a relative listing position, a relative location based on another object (e.g., to the left of a video region, above a cursor), any other suitable position metric, or any combination thereof. In some embodiments, a position metric associated with a media asset listing may include a position on a display screen of listings. For example, display screen 100 of FIG. 1A shows a displayed first media asset listing 102. In some embodiments, a position metric associated with a first media asset listing may include a position that is not displayed. For example, display screen 140 of FIG. 1A does not display first media asset listing 102. When not displayed, the position of a first media asset listing may, for example, correspond to an equivalent position of the listing if the display were big enough to display the first media asset listing. In a further example, the position of the first media asset listing may be its position in a list of media asset listings. In a further example, the position of the first media asset listing may be its coordinates among a list of media asset listings.

Step 1310 may include a media guidance application determining whether the cursor has moved, based on the position metric determined in step 1308. For example, a user may move the cursor from a media asset listing to a different media asset listing while navigating the display. A media guidance application may determine whether a cursor has moved based on any suitable resolution, any suitable position metric, any other suitable information (e.g., user input such as pressing a button), or any combination thereof. For example, a media guidance application may determine that a cursor has moved if the cursor has moved one listing in any direction. In a further example, a media guidance application may determine that a cursor has moved if the cursor has moved by at least two listings in any direction.

Step 1310 may include the media guidance application identifying, with the cursor, a media asset listing. In some embodiments, a media guidance application may receive input from a user navigating the cursor to move among listings, indicate listings of interest, select listings, or otherwise navigate displayed listings. In some embodiments, at step 1310, the media guidance application may identify a position corresponding to a cursor, and the position may correspond to a media asset listing. For example, reference FIG. 1B, the media guidance application may identify "Friends" as the second media asset listing based on cursor positioning highlight region 110.

Step 1312 may include a media guidance application determining a proximity metric. The proximity metric may be based on a position metric of the cursor, or a position metric of a media asset listing associated with the cursor, and a position metric of a first media asset listing.

Step 1314 may include a media guidance application determining whether the cursor is closer to a popular media asset listing after it has been determined to have moved (e.g., at step 1310). The determination of step 1314 may include determining that the cursor is further away from a popular listing, nearer to a popular listing, or at a most popular listing. In some embodiments, a media guidance application may compare the proximity metric of step 1312 to a previously determined proximity metric to determine if the cursor is closer to popular content. For example, a media guidance application may store a history of one or more cursor positions, including the last position (e.g., position prior to a "yes" determination at step 1310). In some embodiments, a media guidance application may determine whether a cursor is further way from a popular listing, in which case the "yes" and "no" decision would be reversed from the configuration shown in FIG. 13. For example, a media guidance application may determine that a cursor is further away from a popular listing, and accordingly at step 1314 follow the "No" path in FIG. 13 to step 1320.

A media guidance application may perform any of steps 1316, 1318, 1320, and 1326 based at least in part on the result of step 1314.

Step 1316 may include a media guidance application maximizing intensity of a visual attribute. In some embodiments, a media guidance application may maximize intensity of a visual attribute to indicate that the cursor is positioned at a listing associated with a most popular media asset, a listing associated with one of a plurality of popular media assets, a listing associated with a most popular media asset of a subset of a plurality of media assets, or any combination thereof. In some embodiments, a media guidance application may maximize intensity if a proximity metric below a threshold. For example, if a cursor is positioned at a media asset listing within two listings of a most popular listing, the media guidance application may maximize intensity of a visual attribute. In some embodiments, a media guidance application may maximize intensity by maximizing a color brightness, maximizing a hue, changing a color to a warmest color (e.g., red or orange), performing any other action that maximizes the intensity of a visual attribute, or any combination thereof. In some embodiments, maximizing intensity corresponds to setting a parameter to a highest possible value, a limiting value, a maximum achievable value, or a predefined maximum value. For example, a media guidance application may maximize intensity by selecting a color of a visual attribute to be the "most red." In a further example, for an available colormap having orange as the warmest color, a media guidance application may maximize intensity by selecting orange.

Step 1318 may include a media guidance application increasing intensity of a visual attribute if it determines that a cursor is closer to popular listings. In some embodiments, a media guidance application may increase intensity of a visual attribute to indicate that the cursor is positioned at a more popular media asset listing. In some embodiments, a media guidance application may increase intensity of a visual attribute by increasing a color brightness, increasing a hue, changing a color to a relatively warmer color (e.g., yellow or orange), performing any other action that reduces the intensity of a visual attribute, or any combination thereof. In some embodiments, a media guidance application may increase an aspect of a pattern associated with a listing. For example, a media guidance application may thicken a border of a media asset listing to increase intensity. In a further example, a media guidance application may increase intensity by changing a color of text of a media asset listing to a relatively warmer color.

Step 1320 may include a media guidance application decreasing intensity of a visual attribute if it determines that a cursor is further from popular listings. In some embodiments, a media guidance application may decrease intensity of a visual attribute to indicate that the cursor is positioned at a "less popular" media asset listing. In some embodiments, a media guidance application may decrease intensity of a visual attribute by reducing a color brightness, reducing a hue, changing a color to a relatively cooler color (e.g., blue or purple), partially removing a current visual attribute (e.g., changing opacity of a visual attribute), completely removing a current visual attribute (e.g., selecting a default visual attribute), performing any other action that reduces the intensity of a visual attribute, or any combination thereof. In some embodiments, a media guidance application may decrease an aspect of a pattern associated with a listing. For example, a media guidance application may thin a border of a media asset listing to decrease intensity. In a further example, a media guidance application may decrease intensity by changing a color of text of a media asset listing to a relatively cooler color.

Step 1326 may include a media guidance application not changing an intensity of a visual attribute (e.g., doing nothing). In some embodiments, a media guidance application may determine at step 1314 that the cursor has not move closer to, nor further from, a popular listing. For example, a cursor may be two listings away from a popular listing, move, and still be two listings away from the popular listing. In some embodiments, a media guidance application may compare a change in proximity metric (e.g., compare to a previous proximity metric), and not change a visual attribute if the change is less than a threshold. For example, a media guidance application may determine that a cursor move of less than one listing closer to, or further from, a popular listing is not sufficient to change a visual attribute. As such, the resolution with which a media guidance application parses the proximity metric may be coarsened or refined to provide a different response to navigation by the user. In some embodiments, under some circumstances, a media guidance application may experience an error, lose communication with a database, lose communication with a user input device, or otherwise be unable to make a determination at step 1314, in which case the media guidance application may default to step 1326.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 13.

The above-described embodiments of the present disclosure are presented for purposes of illustration and not of limitation, and the present disclosure is limited only by the claims that follow. Additionally, it should be noted that any of the devices or equipment discussed in relation to FIGS. 5-6 could be used to perform one or more of the steps in processes 700-1300 in FIGS. 7-13, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method for indicating popular content, the method comprising: generating for display a plurality of media asset listings in a list; determining a popularity metric for a media asset associated with a first media asset listing, wherein the first media asset listing is not included in the plurality of media asset listings; determining a first position metric associated with the first media asset listing; identifying with a cursor a second media asset listing of the plurality of media asset listings; determining a second position metric associated with the second media asset listing; determining a first proximity metric based on the first position metric and the second position metric; and selecting a first visual attribute for the second media asset listing based at least in part on the first proximity metric and the popularity metric, wherein the first visual attribute comprises a first color and an intensity of the first color represents how close or far the respective cursor is to the first media asset listing; identifying with the cursor a third media asset listing of the plurality of media asset listings, determining a third position metric associated with the third media asset listing; determining a second proximity metric based on the first position metric and the third position metric; and selecting a second visual attribute for the third media asset listing based at least in part on the second proximity metric and the popularity metric, wherein the second visual attribute comprises a second color and an intensity of the second color represents how close or far the third media asset listing is to the first media asset listing.

2. The method of claim 1, wherein determining the popularity metric further comprises retrieving popularity information from a database.

3. The method of claim 1, wherein the first proximity metric comprises at least one of:
   a number associated with media asset listings of the plurality of media asset listings positioned in between the first media asset listing and the second media asset listing;
   a number of pixels associated with a region in between the first position and the second position;
   a number associated with a difference between the first position and the second position; and
   a number associated with a spatial distance between the first position and the second position on a display.

4. The method of claim 1, wherein the first visual attribute of the second media asset listing comprises a color of the second media asset listing.

5. The method of claim 1, wherein selecting the first visual attribute for the second media asset listing based at least in part on the first proximity metric and the popularity metric further comprises:
   searching a database based at least in part on the first proximity metric; and
   retrieving from the database, based on the searching, the first visual attribute for the second media asset listing.

6. The method of claim 1, wherein selecting the first visual attribute for the second media asset listing based at least in part on the first proximity metric and the popularity metric further comprises:
   inputting the first proximity metric into a function; and
   determining, based on the function, the first visual attribute for the second media asset listing.

7. The method of claim 1, wherein determining the popularity metric for the media asset associated with the first media asset listing further comprises:
   determining a plurality of popularity metrics associated with the plurality of media assets associated with the plurality of media asset listings; and
   ranking the plurality of popularity metrics.

8. The method of claim 1, further comprising identifying the first media asset listing based at least in part on the popularity metric.

9. A system for indicating popular content, the system comprising: a display device configured to display a plurality of media asset listings; control circuitry configured to: generate for display a plurality of media asset listings in a list, determine a popularity metric for a media asset associated with a first media asset listing, wherein the first media asset listing is not included in the plurality of media asset listings, determine a first position metric associated with the first media asset listing, identify with a cursor a second media asset listing of the plurality of media asset listings, determine a second position metric associated with the second media asset listing, determine a first proximity metric based on the first position metric and the second position metric, and select a first visual attribute for the second media asset listing based at least in part on the first proximity metric and the popularity metric, wherein the first visual attribute comprises a first color and an intensity of the first color represents how close or far the respective cursor is to the first media asset listing; identify with the cursor a third media asset listing of the plurality of media asset listings; determine a third position metric associated with the third media asset listing; determine a second proximity metric based on the first position metric and the third position metric; and select a second visual attribute for the third media asset listing based at least in part on the second proximity metric and the popularity metric, wherein the second visual attribute comprises a second color and an intensity of the second color represents how close or far the third media asset listing is to the first media asset listing.

10. The system of claim 9, wherein the control circuitry is further configured to retrieve popularity information from a database.

11. The system of claim 9, wherein the first proximity metric comprises at least one of:
- a number associated with media asset listings of the plurality of media asset listings positioned in between the first media asset listing and the second media asset listing;
- a number of pixels associated with a region in between the first position and the second position;
- a number associated with a difference between the first position and the second position; and
- a number associated with a spatial distance between the first position and the second position on a display.

12. The system of claim 9, wherein the first visual attribute of the second media asset listing comprises a color of the second media asset listing.

13. The system of claim 9, wherein the control circuitry is further configured to:
- search a database based at least in part on the first proximity metric; and
- retrieve from the database, based on the search, the first visual attribute for the second media asset listing.

14. The system of claim 9, wherein the control circuitry is further configured to:
- input the first proximity metric into a function; and
- determine based on the function, the first visual attribute for the second media asset listing.

15. The system of claim 9, wherein the processing circuitry is further configured to:
- determine a plurality of popularity metrics associated with the plurality of media assets associated with the plurality of media asset listings; and
- rank the plurality of popularity metrics.

16. The system of claim 9, wherein the control circuitry is further configured to identify the first media asset listing based at least in part on the popularity metric.

* * * * *